US010874483B2

(12) United States Patent
Boronkay

(10) Patent No.: US 10,874,483 B2
(45) Date of Patent: Dec. 29, 2020

(54) DIRECT FABRICATION OF ATTACHMENT TEMPLATES WITH ADHESIVE

(71) Applicant: ALIGN TECHNOLOGY, INC., San Jose, CA (US)

(72) Inventor: Allen Boronkay, San Jose, CA (US)

(73) Assignee: ALIGN TECHNOLOGY, INC., San Jose, CA (US)

(*) Notice: Subject to any disclaimer, the term of this patent is extended or adjusted under 35 U.S.C. 154(b) by 0 days.

(21) Appl. No.: 15/202,348

(22) Filed: Jul. 5, 2016

(65) Prior Publication Data

US 2017/0007368 A1    Jan. 12, 2017

Related U.S. Application Data

(60) Provisional application No. 62/189,282, filed on Jul. 7, 2015, provisional application No. 62/189,259, filed on Jul. 7, 2015.

(51) Int. Cl.
*A61C 7/00* (2006.01)
*A61C 7/08* (2006.01)
(Continued)

(52) U.S. Cl.
CPC ............... *A61C 7/002* (2013.01); *A61C 7/08* (2013.01); *A61C 7/10* (2013.01); *A61C 7/14* (2013.01);
(Continued)

(58) Field of Classification Search
CPC .. A61C 7/002; A61C 7/08; A61C 7/10; A61C 7/14; A61C 7/146; A61C 7/36; A61C 19/063
(Continued)

(56) References Cited

U.S. PATENT DOCUMENTS 2,467,432 A    4/1949 Kesling
2,479,780 A    8/1949 Orrin et al.
(Continued)

FOREIGN PATENT DOCUMENTS

AU    3031677 A    5/1979
AU    517102 B2    7/1981
(Continued)

OTHER PUBLICATIONS

Aadr. American Association for Dental Research, Summary of Activities, Mar. 20-23, 1980, Los Angeles, CA, p. 195.
(Continued)

*Primary Examiner* — Yogesh P Patel
*Assistant Examiner* — Stephen R Sparks
(74) *Attorney, Agent, or Firm* — Wilson Sonsini Goodrich & Rosati

(57) ABSTRACT

Systems, methods, and devices for producing orthodontic appliances are provided. In one aspect, an orthodontic appliance comprises an outer shell comprising a plurality of cavities shaped to receive the patient's teeth and generate one or more of a force or a torque in response to the appliance being worn on the patient's teeth. The orthodontic appliance can comprise an inner structure having a stiffness different than a stiffness of the outer shell. The inner structure can be positioned on an inner surface of the outer shell in order to distribute the one or more of a force or a torque to at least one tooth received within the plurality of cavities.

6 Claims, 25 Drawing Sheets

(51) Int. Cl.
*A61C 7/14* (2006.01)
*A61C 7/36* (2006.01)
*A61C 7/10* (2006.01)
*B33Y 50/02* (2015.01)
*B33Y 80/00* (2015.01)
*B29L 31/00* (2006.01)

(52) U.S. Cl.
CPC ............... *A61C 7/146* (2013.01); *A61C 7/36* (2013.01); *B33Y 50/02* (2014.12); *B33Y 80/00* (2014.12); *B29L 2031/753* (2013.01); *G05B 2219/2647* (2013.01); *G05B 2219/35134* (2013.01); *G05B 2219/49007* (2013.01)

(58) Field of Classification Search
USPC ................... 433/3, 6, 8, 9, 24; 128/861, 862
See application file for complete search history.

(56) References Cited

U.S. PATENT DOCUMENTS

| | | |
|---|---|---|
| 2,682,870 A | 7/1954 | Fredrickson et al. |
| 3,407,500 A | 10/1968 | Kesling |
| 3,600,808 A | 8/1971 | James |
| 3,660,900 A | 5/1972 | Lawrence |
| 3,683,502 A | 8/1972 | Melvin |
| 3,738,005 A | 6/1973 | Cohen et al. |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,975,825 A | 8/1976 | Smith |
| 3,983,628 A | 10/1976 | Acevedo |
| 4,014,096 A | 3/1977 | Dellinger |
| 4,195,046 A | 3/1980 | Kesling |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,478,580 A | 10/1984 | Barrut |
| 4,500,294 A | 2/1985 | Lewis |
| 4,504,225 A | 3/1985 | Yoshii |
| 4,505,673 A | 3/1985 | Yoshii |
| 4,526,540 A * | 7/1985 | Dellinger ............... A61C 7/146 433/24 |
| 4,551,096 A * | 11/1985 | Dellinger ............... A61C 7/146 433/24 |
| 4,575,330 A | 3/1986 | Hull |
| 4,575,805 A | 3/1986 | Moermann et al. |
| 4,591,341 A | 5/1986 | Andrews |
| 4,609,349 A | 9/1986 | Cain |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling |
| 4,676,747 A | 6/1987 | Kesling |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz |
| 4,798,534 A | 1/1989 | Breads |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,889,238 A | 12/1989 | Batchelor |
| 4,890,608 A | 1/1990 | Steer |
| 4,935,635 A | 6/1990 | O'Harra |
| 4,936,862 A | 6/1990 | Walker et al. |
| 4,937,928 A | 7/1990 | Van Der Zel |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell |
| 5,011,405 A | 4/1991 | Lemchen |
| 5,017,133 A | 5/1991 | Miura |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,184,306 A | 2/1993 | Erdman et al. |
| 5,186,623 A | 2/1993 | Breads et al. |
| 5,203,700 A | 4/1993 | Chmel |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson |
| 5,342,202 A | 8/1994 | Deshayes |
| 5,368,478 A | 11/1994 | Andreiko et al. |
| 5,382,164 A | 1/1995 | Stern |
| 5,395,238 A | 3/1995 | Andreiko et al. |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. |
| 5,621,648 A | 4/1997 | Crump |
| 5,645,420 A | 7/1997 | Bergersen |
| 5,645,421 A | 7/1997 | Slootsky |
| 5,655,653 A | 8/1997 | Chester |
| 5,683,243 A | 11/1997 | Andreiko et al. |
| 5,692,894 A | 12/1997 | Schwartz et al. |
| 5,725,376 A | 3/1998 | Poirier |
| 5,725,378 A | 3/1998 | Wang |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson |
| 5,823,778 A | 10/1998 | Schmitt et al. |
| 5,848,115 A | 12/1998 | Little et al. |
| 5,857,853 A | 1/1999 | Van et al. |
| 5,866,058 A | 2/1999 | Batchelder et al. |
| 5,879,158 A | 3/1999 | Doyle et al. |
| 5,880,961 A | 3/1999 | Crump |
| 5,880,962 A | 3/1999 | Andersson et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,873 A | 11/1999 | Zimmermann et al. |
| 5,975,893 A | 11/1999 | Chishti et al. |
| 6,015,289 A | 1/2000 | Andreiko et al. |
| 6,044,309 A | 3/2000 | Honda |
| 6,049,743 A | 4/2000 | Baba |

(56) References Cited

U.S. PATENT DOCUMENTS

| | | | |
|---|---|---|---|
| 6,062,861 A | 5/2000 | Andersson | |
| 6,068,482 A | 5/2000 | Snow | |
| 6,099,314 A | 8/2000 | Kopelman et al. | |
| 6,123,544 A | 9/2000 | Cleary | |
| 6,152,731 A | 11/2000 | Jordan et al. | |
| 6,183,248 B1 | 2/2001 | Chishti et al. | |
| 6,190,165 B1 | 2/2001 | Andreiko et al. | |
| 6,217,325 B1 | 4/2001 | Chishti et al. | |
| 6,217,334 B1 | 4/2001 | Hultgren | |
| 6,244,861 B1 | 6/2001 | Andreiko et al. | |
| 6,293,790 B1 | 9/2001 | Hilliard | |
| 6,309,215 B1* | 10/2001 | Phan | A61C 7/00 433/24 |
| 6,315,553 B1 | 11/2001 | Sachdeva et al. | |
| 6,322,359 B1 | 11/2001 | Jordan et al. | |
| 6,350,120 B1 | 2/2002 | Sachdeva et al. | |
| 6,382,975 B1 | 5/2002 | Poirier | |
| 6,398,548 B1 | 6/2002 | Muhammad et al. | |
| 6,402,707 B1 | 6/2002 | Ernst | |
| 6,450,807 B1 | 9/2002 | Chishti et al. | |
| 6,471,511 B1 | 10/2002 | Chishti et al. | |
| 6,482,298 B1 | 11/2002 | Bhatnagar | |
| 6,524,101 B1 | 2/2003 | Phan et al. | |
| 6,554,611 B2 | 4/2003 | Shishti et al. | |
| 6,572,372 B1 | 6/2003 | Phan et al. | |
| 6,607,382 B1 | 8/2003 | Kuo et al. | |
| 6,629,840 B2 | 10/2003 | Chishti et al. | |
| 6,705,863 B2 | 3/2004 | Phan et al. | |
| 6,722,880 B2 | 4/2004 | Chishti et al. | |
| 6,749,414 B1 | 6/2004 | Hanson et al. | |
| 6,830,450 B2 | 12/2004 | Knopp et al. | |
| 7,553,157 B2 | 6/2009 | Abolfathi et al. | |
| 7,819,661 B2 | 10/2010 | Nadav | |
| 7,878,801 B2 | 2/2011 | Abolfathi et al. | |
| 7,883,334 B2 | 2/2011 | Li et al. | |
| 7,892,474 B2 | 2/2011 | Shkolnik et al. | |
| 8,235,713 B2 | 8/2012 | Phan et al. | |
| 8,348,665 B2 | 1/2013 | Kuo | |
| 8,439,672 B2 | 5/2013 | Matov et al. | |
| 8,439,674 B2 | 5/2013 | Li et al. | |
| 8,444,412 B2 | 5/2013 | Baughman et al. | |
| 8,708,697 B2 | 4/2014 | Li et al. | |
| 8,758,009 B2 | 6/2014 | Chen et al. | |
| 8,899,976 B2 | 12/2014 | Chen et al. | |
| 9,655,691 B2 | 5/2017 | Li et al. | |
| 2002/0006597 A1 | 1/2002 | Andreiko et al. | |
| 2002/0192617 A1 | 12/2002 | Phan et al. | |
| 2003/0009252 A1 | 1/2003 | Pavlovskaia et al. | |
| 2003/0139834 A1 | 7/2003 | Nikolskiy et al. | |
| 2003/0224311 A1 | 12/2003 | Cronauer | |
| 2004/0128010 A1 | 7/2004 | Pavlovskaia et al. | |
| 2004/0209218 A1* | 10/2004 | Chishti | A61C 7/00 433/6 |
| 2004/0219473 A1* | 11/2004 | Cleary | A61C 7/146 433/9 |
| 2005/0055118 A1 | 3/2005 | Nikolskiy et al. | |
| 2006/0008760 A1 | 1/2006 | Phan et al. | |
| 2006/0188834 A1 | 8/2006 | Hilliard | |
| 2007/0031775 A1* | 2/2007 | Andreiko | A61C 7/146 433/24 |
| 2007/0065768 A1 | 3/2007 | Nadav | |
| 2007/0087302 A1 | 4/2007 | Reising et al. | |
| 2007/0207434 A1 | 9/2007 | Kuo et al. | |
| 2007/0292821 A1* | 12/2007 | De Vreese | A61C 5/00 433/195 |
| 2008/0268400 A1 | 10/2008 | Moss et al. | |
| 2009/0061375 A1 | 3/2009 | Yamamoto et al. | |
| 2009/0061379 A1 | 3/2009 | Yamamoto et al. | |
| 2009/0191502 A1 | 7/2009 | Cao et al. | |
| 2009/0220921 A1* | 9/2009 | Abolfathi | A61B 5/0028 433/229 |
| 2010/0055635 A1 | 3/2010 | Kakavand | |
| 2010/0092905 A1 | 4/2010 | Martin | |
| 2010/0129762 A1 | 5/2010 | Mason et al. | |
| 2010/0129763 A1 | 5/2010 | Kuo | |
| 2010/0138025 A1 | 6/2010 | Morton et al. | |
| 2010/0239992 A1 | 9/2010 | Brandt et al. | |
| 2010/0285419 A1* | 11/2010 | Cinader, Jr. | A61C 7/146 433/9 |
| 2011/0007920 A1* | 1/2011 | Abolfathi | H04R 25/606 381/326 |
| 2011/0020761 A1 | 1/2011 | Kalili | |
| 2011/0136072 A1 | 6/2011 | Li et al. | |
| 2011/0244413 A1 | 10/2011 | Teasdale | |
| 2011/0281229 A1 | 11/2011 | Abolfathi | |
| 2012/0148971 A1 | 6/2012 | Yamamoto et al. | |
| 2013/0029285 A1* | 1/2013 | Teasdale | A61C 7/00 433/6 |
| 2013/0095446 A1 | 4/2013 | Andreiko et al. | |
| 2013/0302742 A1 | 11/2013 | Li et al. | |
| 2014/0061974 A1 | 3/2014 | Tyler et al. | |
| 2014/0193767 A1 | 7/2014 | Li et al. | |
| 2014/0265034 A1 | 9/2014 | Dudley | |
| 2014/0370452 A1 | 12/2014 | Tseng | |
| 2015/0097315 A1 | 4/2015 | Desimone et al. | |
| 2015/0097316 A1 | 4/2015 | Desimone et al. | |
| 2015/0102532 A1 | 4/2015 | Desimone et al. | |
| 2015/0366637 A1 | 12/2015 | Kopelman et al. | |
| 2015/0366638 A1 | 12/2015 | Kopelman et al. | |
| 2016/0081768 A1 | 3/2016 | Kopelman et al. | |
| 2016/0157961 A1 | 6/2016 | Lee | |
| 2016/0278899 A1 | 9/2016 | Heller et al. | |
| 2017/0007361 A1 | 1/2017 | Boronkay et al. | |
| 2017/0007364 A1 | 1/2017 | Wu et al. | |

FOREIGN PATENT DOCUMENTS

| | | |
|---|---|---|
| AU | 5598894 A | 6/1994 |
| CA | 1121955 A | 4/1982 |
| CN | 104093375 A | 10/2014 |
| DE | 2749802 A1 | 5/1978 |
| DE | 69327661 T2 | 7/2000 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 1/2000 |
| EP | 0774933 B1 | 12/2000 |
| EP | 0731673 B1 | 5/2001 |
| ES | 463897 A1 | 1/1980 |
| FR | 2369828 A1 | 6/1978 |
| FR | 2652256 A1 | 3/1991 |
| GB | 1550777 A | 8/1979 |
| JP | S5358191 A | 5/1978 |
| JP | H0428359 A | 1/1992 |
| JP | H08508174 A | 9/1996 |
| JP | 2013123624 A | 6/2013 |
| JP | 2013123626 A | 6/2013 |
| KR | 200465679 Y1 | 3/2013 |
| WO | WO-9008512 A1 | 8/1990 |
| WO | WO-9104713 A1 | 4/1991 |
| WO | WO-9410935 A1 | 5/1994 |
| WO | WO-9832394 A1 | 7/1998 |
| WO | WO-9844865 A1 | 10/1998 |
| WO | WO-9858596 A1 | 12/1998 |
| WO | WO-0180764 A1 | 11/2001 |
| WO | WO-2009118601 A2 | 10/2009 |
| WO | WO-2017007962 A1 | 1/2017 |

OTHER PUBLICATIONS

Alcaniz, et aL, "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.

Alexander et al., "The DigiGraph Work Station Part 2 Clinical Management," JCO, pp. 402-407 (Jul. 1990).

Altschuler, "3D Mapping of Maxillo-Facial Prosthesis," AADR Abstract #607, 2 pages total, (1980).

(56) References Cited

OTHER PUBLICATIONS

Altschuler et al., "Analysis of 3-D Data for Comparative 3-D Serial Growth Pattern Studies of Oral-Facial Structures," AADR Abstracts, Program and Abstracts of Papers, 57th General Session, IADR HP Annual Session, Mar. 29, 1979-Apr. 1, 1979, New Orleans Marriot, Journal of Dental Research, vol. 58, Jan. 1979, Special Issue A, p. 221.

Altschuler et al., "Laser Electro-Optic System for Rapid Three-Dimensional (3D) Topographic Mapping of Surfaces," Optical Engineering, 20(6):953-961 (1981).

Altschuler et al., "Measuring Surfaces Space-Coded by a Laser-Projected Dot Matrix," SPIE Imaging Applications for Automated Industrial Inspection and Assembly, vol. 182, p. 187-191 (1979).

Andersson et al., "Clinical Results with Titanium Crowns Fabricated with Machine Duplication and Spark Erosion," Acta. Odontol. Scand., 47:279-286 (1989).

Andrews, The Six Keys to Optimal Occlusion Straight Wire, Chapter 3, pp. 13-24 (1989).

Bartels, et al., An Introduction to Splines for Use in Computer Graphics and Geometric Modeling, Morgan Kaufmann Publishers, pp. 422-425 (1987).

Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.

Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.

Baumrind et al., "Mapping the Skull in 3-D," reprinted from J. Calif. Dent. Assoc., 48(2), 11 pages total, (1972 Fall Issue).

Baumrind, "Integrated Three-Dimensional Craniofacial Mapping: Background, Principles, and Perspectives," Semin. in Orthod., 7(4):223-232 (Dec. 2001).

Begole et al., "A Computer System for the Analysis of Dental Casts," The Angle Orthod., 51(3):253-259 (Jul. 1981).

Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.

Bhatia et al., "A Computer-Aided Design for Orthognathic Surgery," Br. J. Oral Maxillofac. Surg., 22:237-253 (1984).

Biggerstaff, "Computerized Diagnostic Setups and Simulations," Angle Orthod., 40(1):28-36 (Jan. 1970).

Biggerstaff et al., "Computerized Analysis of Occlusion in the Postcanine Dentition," Am. J. Orthod., 61(3): 245-254 (Mar. 1972).

Biostar Opeation & Training Manual. Great Lakes Orthodontics, Ltd. 199 Fire Tower Drive, Tonawanda, New York. 14150-5890, 20 pages total (1990).

Blu, et al., "Linear interpolation revitalized", IEEE Trans. Image Proc., 13(5):710-719 (May 2004.

Bourke, "Coordinate System Transformation," (Jun. 1996), p. 1, retrieved from the Internet Nov. 5, 2004, URL< http://astronomy.swin.edu.au/—pbourke/prolection/coords>.

Boyd et al., "Three Dimensional Diagnosis and Orthodontic Treatment of Complex Malocclusions With the Invisalipn Appliance," Semin. Orthod., 7(4):274-293 (Dec. 2001).

Brandestini et al., "Computer Machined Ceramic Inlays: In Vitro Marginal Adaptation," J. Dent. Res. Special Issue, Abstract 305, vol. 64, p. 208 (1985).

Brook et al., "An Image Analysis System for the Determination of Tooth Dimensions from Study Casts: Comparison with Manual Measurements of Mesio-distal Diameter," J. Dent. Res., 65(3):428-431 (Mar. 1986).

Burstone et al., Precision Adjustment of the Transpalatal Lingual Arch: Computer Arch Form in Predetermination, Am, Journal of Orthodontics, vol. 79, No. 2 (Feb. 1981), pp. 115-133.

Burstone (interview), "Dr. Charles J. Burstone on the Uses of the Computer in Orthodontic Practice (Part 1)," J. Clin. Orthod., 13(7):442-453 (Jul. 1979).

Burstone (interview), "Dr. Charles J. Burstone on the Uses of the Computer in Orthodontic Practice (Part 2)," J. Clin. Orthod., 13(8):539-551 (Aug. 1979).

Carbon3D. Clip Technology. A new approach to 3D printing. 2015. http://carbon3d.com/ Accessed Jul. 1, 2015.

Cardinal Industrial Finishes, Powder Coatings information posted at<http://www.cardinalpaint.com> on Aug. 25, 2000, 2 pages.

Carnaghan, "An Alternative to Holograms for the Portrayal of Human Teeth," 4th Int'l Conf. on Holographic Systems, Components and Applications, Sep. 15, 1993, pp. 228-231.

Chaconas et al., "The DigiGraph Work Station, Part 1, Basic Concepts," JCO, pp. 360-367 (Jun. 1990).

Chafetz et al., "Subsidence of the Femoral Prosthesis, a Stereophotogrammetric Evaluation," Clin. Orthop. Relat. Res., No. 201, pp. 60-67 (Dec. 1985).

Chiappone, (1980). Constructing the Gnathologic Setup and Positioner, J. Clin. Orthod, vol. 14, pp. 121-133.

Composite material. Wikipedia. Last modified Jun. 22, 2015. https://en.wikipedia.org/wiki/Composite_material.

Cottingham, (1969). Gnathologic Clear Plastic Positioner, Am. J. Orthod, vol. 55, pp. 23-31.

Crawford, "CAD/CAM in the Dental Office: Does It Work?", Canadian Dental Journal, vol. 57, No. 2, pp. 121-123 (Feb. 1991).

Crawford, "Computers in Dentistry: Part 1 CAD/CAM: The Computer Moves Chairside," Part 2 F. Duret—A Man with a Vision, "Part 3 The Computer Gives New Vision—Literally," Part 4 Bytes 'N Bites—The Computer Moves from the Front Desk to the Operatory, Canadian Dental Journal, vol. 54 (9), pp. 661-666 (1988).

Crooks, "CAD/CAM Comes to USC," USC Dentistry, pp. 14-17 (Spring 1990).

Cureton, Correcting Malaligned Mandibular Incisors with Removable Retainers, J. Clin. Orthod, vol. 30, No. 7 (1996) pp. 390-395.

Curry et al., "Integrated Three-Dimensional Craniofacial Mapping at the Craniofacial Research Instrumentation Laboratory/University of the Pacific," Semin. Orthod., 7(4):258-265 (Dec. 2001).

Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).

DCS Dental AG, "The CAD/CAM 'DCS Titan System' for Production of Crowns/Bridges," DSC Production AG, pp. 1-7 (Jan. 1992.

Definition for gingiva. Dictionary.com p. 1-3. Retrieved from the internet Nov. 5, 2004<http://reference.com/search/search?q=gingiva>.

Defranco et al., "Three-Dimensional Large Displacement Analysis of Orthodontic Appliances," J. Biomechanics, 9:793-801 (1976).

Dental Institute University of Zurich Switzerland, Program for International Symposium JD on Computer Restorations: State of the Art of the CEREC-Method, May 1991, 2 pages total.

Dentrac Corporation, Dentrac document, pp. 4-13 (1992).

Dent-X posted on Sep. 24, 1998 at< http://www.dent-x.com/DentSim.htm>, 6 pages.

Desimone. What if 3D printing was 100% faster? TEDtalk. Mar. 2015. http://www.ted.com/talks/joe_desimone_what_if_3d_printing_was_25x_faster.

Doyle, "Digital Dentistry," Computer Graphics World, pp. 50-52, 54 (Oct. 2000).

DuraClearTM product information, Allesee Orthodontic Appliances-Pro Lab, 1 page. (1997).

Duret et al., "CAD/CAM Imaging in Dentistry," Curr. Opin. Dent., 1:150-154 (1991).

Duret et al, "CAD-CAM in Dentistry," J. Am. Dent. Assoc. 117:715-720 (Nov. 1988).

Duret, "The Dental CAD/CAM, General Description of the Project," Hennson International Product Brochure, 18 pages total, Jan. 1986.

Duret,"Vers Une Prosthese Informatisee," (English translation attached), Tonus, vol. 75, pp. 55-57 (Nov. 15, 1985).

(56) References Cited

OTHER PUBLICATIONS

Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et a/., "Automated Finite Element Modeling of a Human Mandible with Dental Implants," JS WSCG '98—Conference Program, retrieved from the Internet:<http://wscg.zcu.cz/wscg98/papers98/Strasser 98.pdf>, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
GIM-ALLDENT Deutschland, "Das DUX System: Die Technik," 2 pages total (2002).
Gottleib et al., "JCO Interviews Dr. James A. McNamara, Jr., on the Frankel Appliance: Part 2: Clinical 1-1 Management," J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxiiofacial Surgery," AAOMS, 3 pages total, (Sep. 13, 1990).
Guess et al., "Computer Treatment Estimates in Orthodontics and Orthognathic Surgery," JCO, pp. 262-28 (Apr. 1989).
Halterman. A path to the future—continuous composite 3D printing. Nov. 12, 2014. http://www.3dprinterworld.com/article/path-future-continuous-composite-3d-printing.
Heaven et a/., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . . >.
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).
Hipolite. Helios One 3D Printer—New Heliolithography Technology Could Eventually Replace SLA and FDM. Jul. 2, 2014. http://3dprint.com/7958/orange-maker-helio-one-3d/.
Hoffmann, et al., "Role of Cephalometry for Planning of Jaw Orthopedics and Jaw Surgery Procedures," (Article Summary in English, article in German), Informatbnen, pp. 375-396 (Mar. 1991).
Hojjatie et al., "Three-Dimensional Finite Element Analysis of Glass-Ceramic Dental Crowns," J. Biomech., 23(11):1157-1166 (1990).
Huckins, "CAD-CAM Generated Mandibular Model Prototype from MRI Data," AAOMS, p. 96 (1999).
Important Tip About Wearing the Red White & Blue Active Clear Retainer System, Allesee Orthodontic Appliances-Pro Lab, 1 page 1998).
"International search report with written opinion dated Oct. 4, 2016 for PCT/IB2016/000976".
"International search report with written opinion dated Nov. 28, 2016 for PCT/US2016/41383".
JCO Interviews, Craig Andreiko , DDS, MS on the Elan and Orthos Systems, JCO, pp. 459-468 (Aug. 1994).
JCO Interviews, Dr. Homer W. Phillips on Computers in Orthodontic Practice, Part 2, JCO. 1997; 1983:819-831.
Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
JP Faber et al., "Computerized Interactive Orthodontic Treatment Planning," Am. J. Orthod., 73(1):36-46 (Jan. 1978).
Kamada et.al., Case Reports on Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).
Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984).
KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: an Application in Orthodontics," IEEE Transactions on Medical Imaging, 10(3):453-461 (Sep. 1991.
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
McCann, "Inside the ADA," J. Amer. Dent. Assoc., 118:286-294 (Mar. 1989).
McNamara et al., "Invisible Retainers," J. Cfin. Orthod., pp. 570-578 (Aug. 1985).
McNamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy as One, Two, Three," AOA/PRO Corner, vol. 11, No. 1, 2 pages (2002).
Mormann et al., "Marginale Adaptation von adhasuven Porzellaninlays in vitro," Separatdruck aus: Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, 22-23 (Oct. 1990).
Nishiyama et al., "A New Construction of Tooth Repositioner by LTV Vinyl Silicone Rubber," J. Nihon Univ. Sch. Dent., 19(2):93-102 (1977).
Objet Geometries. Wikipedia. Last modified Jul. 17, 2014. https://en.wikipedia.org/wiki/Objet_Geometries.
Orange Maker. High resolution 3D printing technology. 2015. http://www.orangemaker.com/. Accessed Jul. 1, 2015.
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.

(56) References Cited

OTHER PUBLICATIONS

Ponitz, "Invisible Retainers," Am. J. Orthod., 59(3):266-272 (Mar. 1971).
PROCERA Research Projects, "PROCERA Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993.
Raintree Essix & ARS Materials, Inc., Raintree Essix, Technical Magazine Table of contents and Essix Appliances,< http://www.essix.com/magazine/defaulthtml> Aug. 13, 1997.
Rapid prototyping. Protosys Technologies. 2005. http://www.protosystech.com/rapid-prototyping.htm. Accessed Jul. 1, 2015.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD/CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording the Dental Cast in Three Dimensions," Am. J. Orthod. Dentofacial Orthop., 92(3):199-206 (Sep. 1987).
Rudge, "Dental Arch Analysis: Arch Form, a Review of the Literature," Eur. J. Orthod., 3(4):279-284 1981.
Sakuda et al., "Integrated Information-Processing System in Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolamp!. Head Neck Sur9., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," High Tech in der Zahnmedizin, 14 pages total (2004). •.
Sinclair, "The Readers' Corner," J. Clin. Orthod., 26(6):369-372 (Jun. 1992).
Sirona Dental Systems GmbH, CEREC 3D, Manuel utiiisateur, Version 2.0X (in French), 2003,114 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.

The Choice Is Clear: Red, White & Blue . . . The Simple, Affordable, No-Braces Treatment, Allesee HI Orthodontic Appliances-Pro Lab product information for doctors. http://ormco.com/aoa/appliancesservices/RWB/doctorhtml>, 5 pages (May 19, 2003).
The Choice is Clear: Red, White & Blue . . . The Simple, Affordable, No-Braces Treatment, Allesee HJ Orthodontic Appliances-Pro Lab product information for patients,< http://ormco.com/aoa/appliancesservices/RWB/patients.html>, 2 pages (May 19, 2003).
The Choice Is Clear: Red, White & Blue . . . The Simple, Affordable, No-Braces Treatment, Allesee Orthodontic Appliances-Pro Lab product information, 6 pages (2003).
The Orange Maker Spins the Plate to Make Better 3D Prints. Newloop Tech and Gadgets. YouTube. Jul. 11, 2014. https://www.youtube.com/watch?v=MpzPWURWfZk.
The Red, White & Blue Way to Improve Your Smile! Allesee Orthodontic Appliances-Pro Lab product information for patients, 2 pages 1992.
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography[SM]," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11):769-778 (1993.
Varady et al., "Reverse Engineering of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 399-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987.
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL<http://wscg.zcu.cz/wscg98/wscg98.h>.
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).

(56) References Cited

OTHER PUBLICATIONS

Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
You May Be a Candidate for This Invisible No-Braces Treatment, Allesee Orthodontic Appliances-Pro Lab product information for patients, 2 pages (2002).
Co-pending U.S. Appl. No. 16/932,557, filed Jul. 17, 2020.

\* cited by examiner

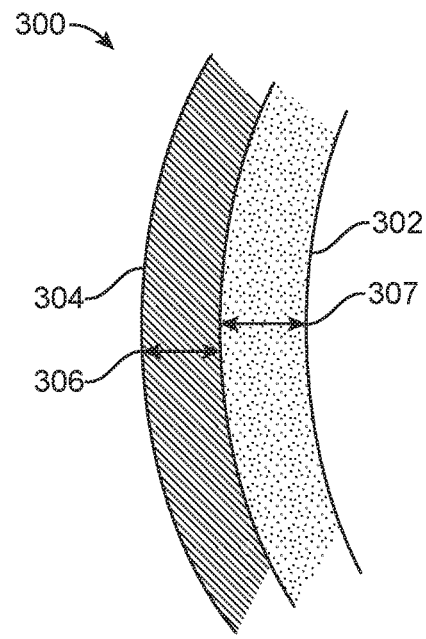
FIG. 3A
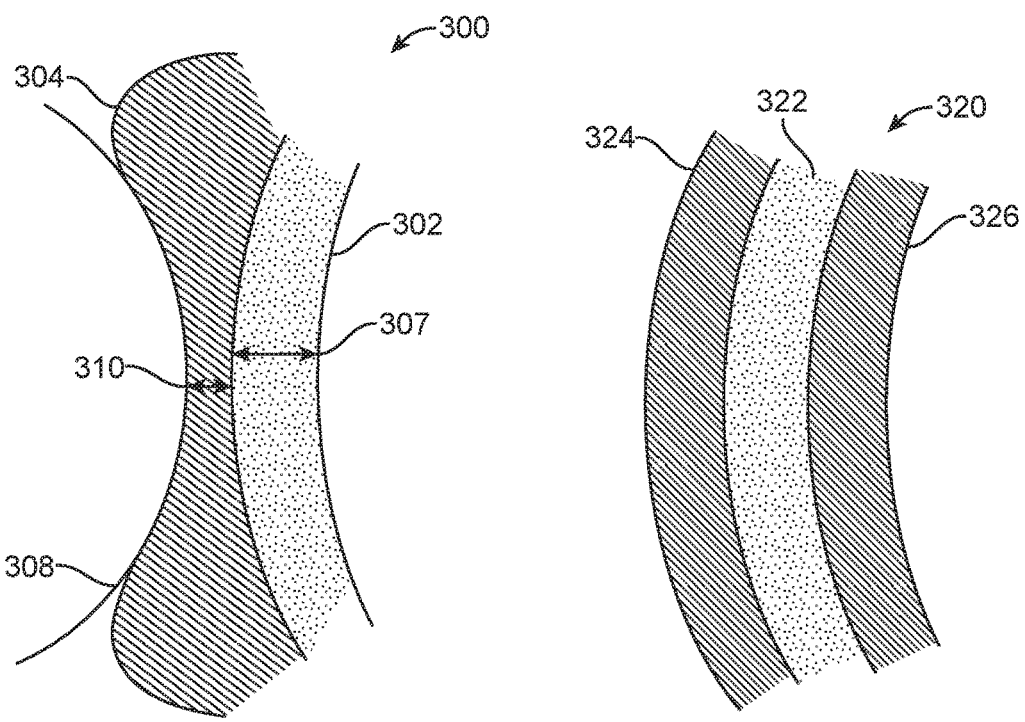
FIG. 3B
FIG. 3C

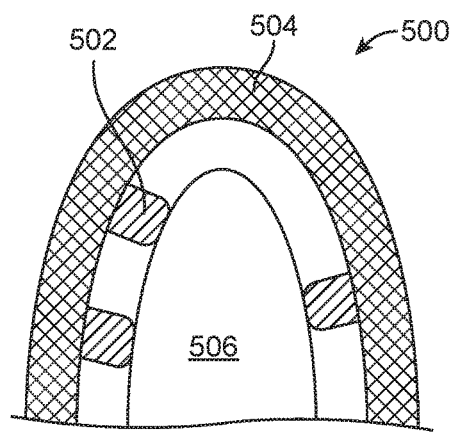
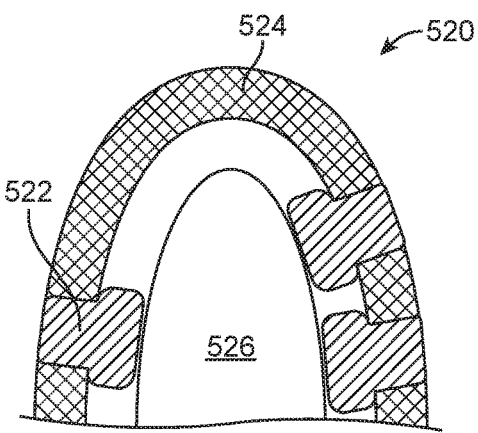
FIG. 5A  FIG. 5B
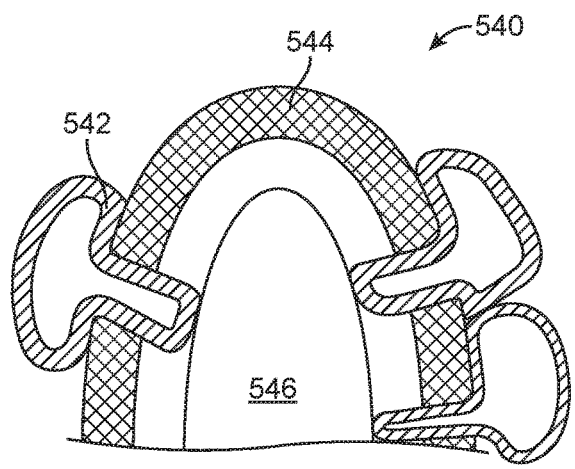
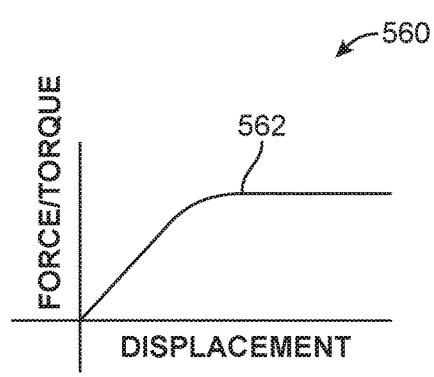
FIG. 5C  FIG. 5D

DIRECT FABRICATION OF ATTACHMENT TEMPLATES WITH ADHESIVE

CROSS-REFERENCE

This application claims the benefit of U.S. Provisional Application No. 62/189,282, filed Jul. 7, 2015, and U.S. Provisional Application No. 62/189,259, filed Jul. 7, 2015, the disclosures of each of which are incorporated herein by reference in their entirety.

The subject matter of the following co-pending patent applications is related to the present application: U.S. Application Ser. No. 62/189,259, filed Jul. 5, 2016, entitled "MULTI-MATERIAL ALIGNERS", which claims the benefit of U.S. Provisional Application No. 62/189,259, filed Jul. 7, 2015 and U.S. Provisional Application No. 62/189,282, filed Jul. 7, 2015; U.S. application Ser. No. 15/202,472, filed Jul. 5, 2016, entitled "DIRECT FABRICATION OF ALIGNERS WITH INTERPROXIMAL FORCE COUPLING", which claims the benefit of U.S. Provisional Application No. 62/189,263, filed Jul. 7, 2015; U.S. application Ser. No. 15/202,452, filed Jul. 5, 2016, entitled "DIRECT FABRICATION OF ALIGNERS FOR ARCH EXPANSION", which claims the benefit of U.S. Provisional Application No. 62/189,271, filed Jul. 7, 2015, and U.S. Provisional Application No. 62/189,301, filed Jul. 7, 2015; U.S. application Ser. No. 15/202,467, filed Jul. 5, 2016, entitled "DIRECT FABRICATION CROSS-LINKING FOR PALATE EXPANSION AND OTHER APPLICATIONS", which claims the benefit of U.S. Provisional Application No. 62/189,301, filed Jul. 7, 2015, and U.S. Provisional Application No. 62/189,271, filed Jul. 7, 2015; U.S. application Ser. No. 15/202,254, filed Jul. 5, 2016, entitled "SYSTEMS, APPARATUSES AND METHODS FOR DENTAL APPLIANCES WITH INTEGRALLY FORMED FEATURES", which claims the benefit of U.S. Provisional Application No. 62/189,291, filed Jul. 7, 2015, U.S. Provisional Application No. 62/189,312, filed Jul. 7, 2015, and U.S. Provisional Application No. 62/189,317, filed Jul. 7, 2015; U.S. application Ser. No. 15/202,299, filed Jul. 5, 2016, entitled "DIRECT FABRICATION OF POWER ARMS", which claims the benefit of U.S. Provisional Application No. 62/189,291, filed Jul. 7, 2015, U.S. Provisional Application No. 62/189,312, filed Jul. 7, 2015, and U.S. Provisional Application No. 62/189,317, filed Jul. 7, 2015; U.S. application Ser. No. 15/202,187, filed Jul. 5, 2016, entitled "DIRECT FABRICATION OF ORTHODONTIC APPLIANCES WITH VARIABLE PROPERTIES", which claims the benefit of U.S. Provisional Application No. 62/189,291, filed Jul. 7, 2015, U.S. Provisional Application No. 62/189,312, filed Jul. 7, 2015, and U.S. Provisional Application No. 62/189,317, filed Jul. 7, 2015; U.S. application Ser. No. 15/202,139, filed Jul. 5, 2016, entitled "SYSTEMS, APPARATUSES AND METHODS FOR SUBSTANCE DELIVERY FROM DENTAL APPLIANCE", which claims the benefit of U.S. Provisional Application No. 62/189,303, filed Jul. 7, 2015; U.S. application Ser. No. 15/201,958, filed Jul. 5, 2016, entitled "DENTAL MATERIALS USING THERMOSET POLYMERS", which claims the benefit of U.S. Provisional Application No. 62/189,380, filed Jul. 7, 2015; and U.S. application Ser. No. 15/202,083, filed Jul. 5, 2016, entitled "DENTAL APPLIANCE HAVING ORNAMENTAL DESIGN", which claims the benefit of U.S. Provisional Application No. 62/189,318, filed Jul. 7, 2015, the entire disclosures of which are incorporated herein by reference.

BACKGROUND

Prior orthodontic procedures typically involve repositioning a patient's teeth to a desired arrangement in order to correct malocclusions and/or improve aesthetics. To achieve these objectives, orthodontic appliances such as braces, retainers, shell aligners, and the like can be applied to the patient's teeth by an orthodontic practitioner. The appliance can be configured to exert force on one or more teeth in order to effect desired tooth movements. The application of force can be periodically adjusted by the practitioner (e.g., by altering the appliance or using different types of appliances) in order to incrementally reposition the teeth to a desired arrangement.

Attachments can also be placed on teeth for dental and orthodontic treatments to aid in the repositioning of a patient's teeth.

The prior orthodontic methods and apparatus to move teeth can be less than ideal in at least some respects. In some instances prior orthodontic approaches that employ an appliance with homogeneous and/or continuous material properties may not provide sufficient control over the forces applied to the teeth. For example, prior appliances fabricated from a single material may exhibit less than ideal control over the forces applied to subsets of teeth. In some instances, relatively stiff orthodontic appliances may require tighter manufacturing tolerances than would be ideal, and the manufacturing tolerances may undesirably affect the accuracy of the applied forces in at least some instances. Also, in at least some instances the appliance may distort at locations away from the teeth to be moved, such that the accuracy of the tooth movement can be less than ideal.

Although attachment templates have been proposed to place attachments on teeth, the prior methods and apparatus can be somewhat more difficult to use than would be ideal. Also, the accuracy of the prior attachment templates can be somewhat less accurate than would be ideal. The methods of manufacture of the prior alignment templates can be somewhat more time consuming and expensive than would be ideal.

In light of the above, improved orthodontic appliances are needed. Ideally such appliances would provide more accurate tooth movement with improved control over the forces applied to the teeth, more constant amounts of force applied onto teeth during treatment, and reduced sensitivity to manufacturing tolerances.

SUMMARY

Improved systems, methods, and devices for repositioning a patient's teeth are provided herein. An orthodontic appliance for repositioning teeth comprises heterogeneous properties in order to improve control of force and/or torque application onto different subsets of teeth. For instance, different portions of an appliance can comprise different material compositions in order to produce different localized stiffness, and the different localized stiffness can be used to generate localized forces and/or torques that are customized to the particular underlying teeth. In some embodiments, the appliance comprises a stiff outer shell that generates the force and/or torque and a compliant inner structure that engages with the tooth surface in order to improve the force and/or torque distribution to the tooth. Advantageously, the use of a compliant inner structure coupled to a stiff outer shell can reduce fluctuations in the amount of force or torque applied, which can improve the accuracy and reliability of the appliance. Alternatively or in combination, the approaches described herein for appliance design and fabrication permit the identification of spatial correspondences between portions of an appliance shell and portions of a material sheet used to form the shell, which can improve the accuracy of fabricating appliances with different localized properties for improved control of the force and/or torque application to teeth.

In a first aspect, an orthodontic appliance for repositioning a patient's teeth in accordance with a treatment plan comprises an outer shell comprising a plurality of cavities shaped to receive the patient's teeth and generate one or more of a force or a torque in response to the appliance being worn on the patient's teeth. The orthodontic appliance can comprise an inner structure having a stiffness different than a stiffness of the outer shell. The inner structure can be positioned on an inner surface of the outer shell in order to distribute the one or more of a force or a torque to at least one received tooth.

In another aspect, a method for designing an orthodontic appliance for repositioning a patient's teeth in accordance with a treatment plan comprises receiving a 3D representation of a shell comprising a plurality of cavities shaped to receive the patient's teeth. The shell can comprise a plurality of shell portions each positioned to engage a different subset of the patient's teeth. The method can further comprise generating a 2D representation corresponding to the 3D representation of the shell. The 2D representation can represent a material sheet to be used to form the shell. The material sheet can comprise a plurality of sheet portions corresponding to the plurality of shell portions.

The methods and appliances disclosed herein also provide improved placement of attachments on teeth. The appliances can be directly manufactured, such that the appliances can be manufactured in a cost effective manner. In many embodiments, the appliance comprises a support comprising one or more coupling structures to hold the one or more attachments. An alignment structure is coupled to the support to receive at least a portion of a tooth and position the one or more attachments at one or more predetermined locations on the one or more teeth. The one or more coupling structures are configured to release the attachment with removal of the alignment structure from the one or more teeth. In some embodiments, an attachment can be directly manufactured with an adhesive, and a removable cover may be directly manufactured over the adhesive.

The one or more coupling structures can be directly manufactured and configured in many ways to release from the teeth. The one or more coupling structures can be sized and shaped to hold the attachment. The one or more coupling structures are sized and shaped to hold the attachment with a gap extending between the support and attachment. The one or more coupling structures may comprise one or more extensions extending between the support and the attachment. The one or more coupling structures may comprise a plurality of extensions extending between the support and the attachment. The one or more coupling structures may comprise a separator sized and shaped to separate the attachment from the support. The one or more coupling structures comprises a recess formed in the support, the recess sized and shaped to separate the attachment from the support.

While the appliance can be manufactured in many ways, in many embodiments the appliance is manufactured in response to three dimensional scan data of a mouth of the patient. Three dimensional scan data of a mouth of the patient can be received. A three dimensional shape profile of a support determined in response to the three dimensional scan data, and a three dimensional shape profile of an alignment structure is determined in response to the scan data. A three dimensional shape profile of the one or more coupling structures can be determined in response to the three dimensional scan data in order to release the attachment with removal of the alignment structure from the one or more teeth.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 3A and 3B illustrate a portion of an orthodontic appliance including a stiff outer shell and a compliant inner structure, in accordance with embodiments;

FIG. 3C illustrates a portion of a three-layer orthodontic appliance, in accordance with embodiments;

FIG. 5A illustrates an appliance with a plurality of discrete pad structures, in accordance with embodiments;

FIG. 5B illustrates an appliance with a plurality of discrete plug structures, in accordance with embodiments;

FIG. 5C illustrates an appliance with a plurality of discrete inflatable structures, in accordance with embodiments;

FIG. 5D illustrates an exemplary load-displacement curve for an appliance, in accordance with embodiments;

DETAILED DESCRIPTION

Figure 1A:
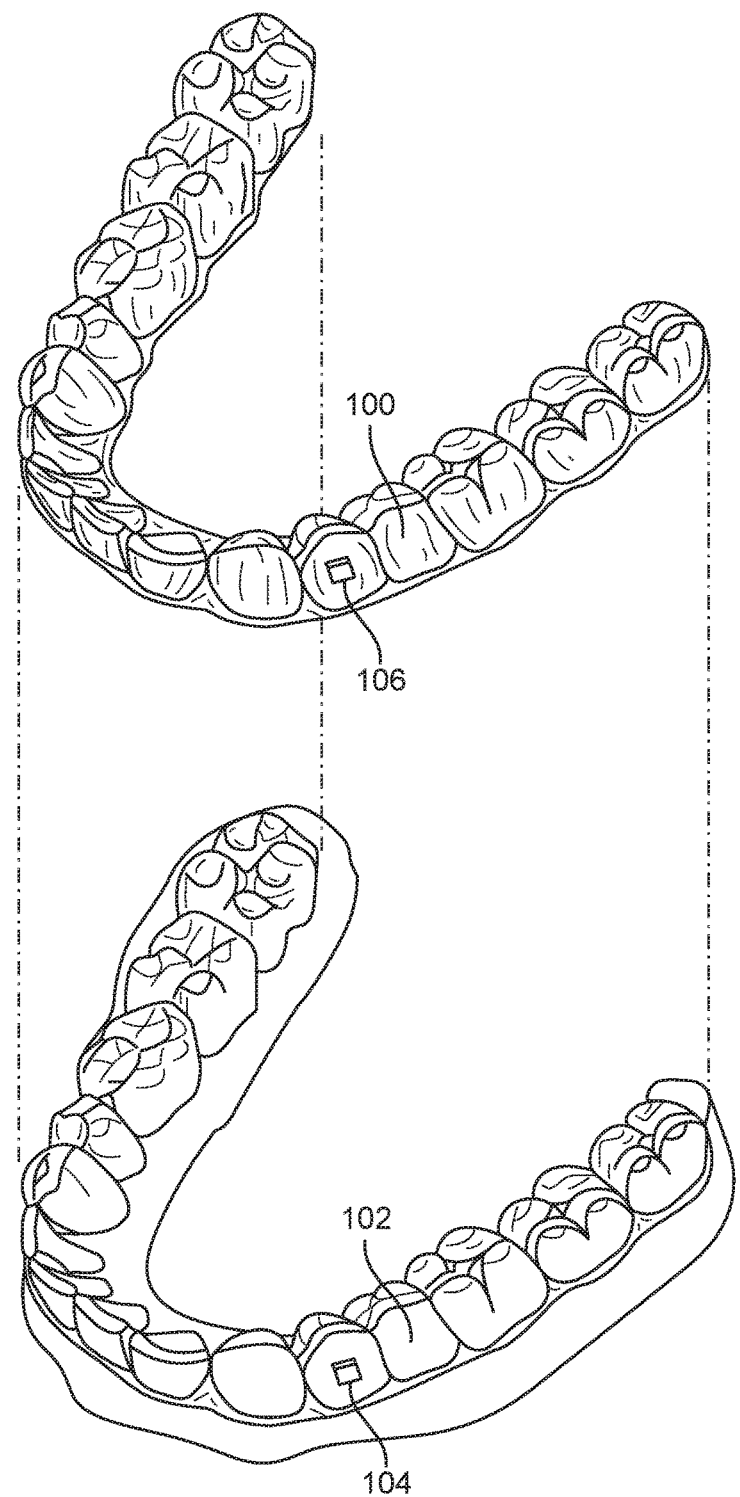
FIG. 1A illustrates a tooth repositioning appliance, in accordance with embodiments.

Systems, methods, and devices for improved orthodontic treatment of a patient's teeth are provided herein. In some embodiments, the present disclosure provides improved orthodontic appliances having different portions with different properties. The use of appliances with different localized properties as described herein can improve control over the application of forces and/or torques to different subsets of teeth, thus enhancing the predictability and effectiveness of orthodontic treatment. For example, an orthodontic appliance can include portions with different stiffness (e.g., a relatively stiff portion and a relatively compliant portion) to provide more consistent force and/or torque application even when manufacturing tolerances for the appliance are relatively poor. Additionally, the appliance design and fabrication methods described herein can enhance the accuracy and flexibility of producing appliances with different localized properties, thus allowing for the production of more complex and customized appliances.

In one aspect, an orthodontic appliance for repositioning a patient's teeth in accordance with a treatment plan is provided. The appliance can comprise an outer shell comprising a plurality of cavities shaped to receive the patient's teeth and generate one or more of a force or a torque in response to the appliance being worn on the patient's teeth, and an inner structure having a stiffness different than a stiffness of the outer shell. The inner structure can be positioned on an inner surface of the outer shell in order to distribute the one or more of a force or a torque to at least one tooth received within the plurality of cavities.

In another aspect, an orthodontic appliance for repositioning a patient's teeth in accordance with a treatment plan is provided. The appliance can comprise an outer shell comprising a plurality of teeth-receiving cavities shaped to exert one or more of a force or a torque on the patient's teeth, and an inner structure positioned on an inner surface of the outer shell. The inner structure can comprise a stiffness different than a stiffness of the outer shell such that the inner structure is configured to exhibit an amount of deformation greater than an amount of deformation exhibited by the outer shell.

In some embodiments, the stiffness of the inner structure is less than the stiffness of the outer shell. The inner structure can be configured to exhibit a first configuration prior to placement of the appliance on the patient's teeth and a second configuration after the placement of the appliance on the patient's teeth. The first configuration can differ from the second configuration with respect to one or more of: a thickness profile of the inner structure, a cross-sectional shape of the inner structure, or an inner surface profile of the inner structure. The inner structure can be configured to exhibit an amount of deformation greater than an amount of deformation exhibited by the outer shell when the appliance is worn on the patient's teeth. The deformation of the inner structure can comprise one or more of: a change in a thickness profile of the inner structure, a change in a cross-sectional shape of the inner structure, or a change in an inner surface profile of the inner structure. The outer shell can exhibit substantially no deformation when the appliance is worn on the patient's teeth.

In some embodiments, the inner structure comprises a compressible material. The inner structure can have an elastic modulus within a range from about 0.2 MPa to about 20 MPa.

In some embodiments, an inner surface profile of the outer shell differs from a surface profile of the at least one tooth so as to generate the one or more of a force or a torque when the appliance is worn on the patient's teeth. For example, the inner surface profile of the outer shell can comprise a position or an orientation of a tooth-receiving cavity different from a position or an orientation of the surface profile of at least one tooth received within the tooth-receiving cavity. The inner surface profile of the outer shell can comprise a protrusion extending inwards towards the at least one tooth, and wherein the inner structure is positioned between the protrusion and the at least one tooth.

In some embodiments, the inner structure comprises a continuous inner layer positioned between the outer shell and the patient's teeth. The continuous inner layer can be removably coupled to the outer shell or permanently affixed to the outer shell. The continuous inner layer can comprise a first layer portion with an increased thickness relative to a second layer portion, and the first layer portion can be positioned to engage the at least one tooth in order to distribute one or more of a force or a torque.

In some embodiments, the inner structure comprises one or more discrete pad structures positioned to engage the at least one tooth. The one or more discrete pad structures can engage the at least one received tooth via one or more attachments mounted on the at least one tooth. Optionally, the inner structure can comprise a plurality of discrete pad structures each positioned to engage a different portion of the at least one tooth. The one or more discrete pad structures can be solid. Alternatively, the one or more discrete pad structures can be hollow. In some embodiments, the one or more discrete pad structures are filled with a fluid optionally maintained at a substantially constant pressure.

In some embodiments, the inner structure is coupled to the inner surface of the outer shell. Alternatively or in combination, the inner structure can be coupled to a tooth surface or an attachment mounted on the tooth surface.

In some embodiments, the appliance further comprises an outermost layer coupled to an outer surface of the outer shell. The outermost layer can have a stiffness less than or greater than the stiffness of the outer shell. The outermost layer can be configured to resist abrasion, wear, staining, or biological interactions. The outermost layer can have a hardness greater than or equal to about 70 Shore D.

In some embodiments, the appliance further comprises an innermost layer coupled to an inner surface of the inner structure. The innermost layer can have a stiffness less than or greater than the stiffness of the inner structure. The innermost layer can be configured to resist abrasion, wear, staining, or biological interactions. The innermost layer can have a hardness greater than or equal to about 70 Shore D.

In some embodiments, the inner structure comprises a textured surface shaped to channel saliva away from or towards a surface of the at least one tooth.

In some embodiments, the inner structure is formed by one or more of milling, etching, coating, jetting, stereolithography, or printing. Optionally, the inner structure is integrally formed as a single piece with the outer shell by a direct fabrication technique. Direct fabrication techniques can comprise one or more of vat photopolymerization, material jetting, binder jetting, material extrusion, powder bed fusion, sheet lamination, or directed energy deposition. The direct fabrication technique can comprise multi-material direct fabrication.

In another aspect, a method comprises providing an appliance as in any of the embodiments herein.

In another aspect, a method for designing an orthodontic appliance for repositioning a patient's teeth in accordance with a treatment plan is provided. The method can comprise receiving a 3D representation of a shell comprising a plurality of cavities shaped to receive the patient's teeth, the shell comprising a plurality of shell portions each positioned to engage a different subset of the patient's teeth. The method can comprise generating a 2D representation corresponding to the 3D representation of the shell, the 2D representation representing a material sheet to be used to form the shell. The material sheet can comprise a plurality of sheet portions corresponding to the plurality of shell portions.

In some embodiments, the 2D representation is generated based on one or more of cavity geometries for the plurality of cavities, a fabrication method to be used to form the shell, a fabrication temperature to be used to form the shell, one or more materials to be used to form the shell, material properties of the one or more materials to be used to form the shell, or a strain rate of the one or more materials to be used to form the shell. The 2D representation can be generated by transforming the 3D representation, the transforming comprising one or more of expanding or flattening the 3D representation. The 2D representation can be generated by simulating a direct or inverse deformation from the 2D representation to the 3D representation In some embodiments, the method further comprises determining a material composition for each of the plurality of sheet portions. At least some of the plurality of sheet portions can comprise different material compositions. The method can further comprise generating instructions for fabricating the material sheet comprising the plurality of sheet portions with the determined material compositions, and generating instructions for forming the shell from the fabricated material sheet. In some embodiments, the inner shell includes a tooth facing surface and an outer surface of the outer shell is exposed.

In some embodiments, at least some of the plurality of different sheet portions have different geometries. At least some of the plurality of different sheet portions can have different stiffness. The method can further comprise determining a desired stiffness for each of the plurality of sheet portions, and determining the material composition for each of the plurality of sheet portions based on the desired stiffness. The different material compositions can comprise one or more of: different numbers of material layers, different combinations of material types, or different thicknesses of a material layer.

In some embodiments, the fabricated material sheet comprises an outer layer and an inner layer having a stiffness less than a stiffness of the outer layer, and the inner layer is positioned between the outer layer and the patient's teeth when the shell is worn on the patient's teeth. The different material compositions can comprise different thicknesses of the inner layer. The outer layer can be configured to generate at least one force or torque when the shell is worn on the patient's teeth and the inner layer can be configured to distribute the at least one force or torque to at least one received tooth.

In some embodiments, fabricating the material sheet comprises providing a layer of a first material, and adding a second material to one or more portions of the layer. Alternatively or in combination, fabricating the material sheet can comprise providing a sheet comprising a layer of a first material and a layer of a second material, and removing one or more portions of the layer of the second material. Optionally, fabricating the material sheet comprises coupling a plurality of overlapping material layers to form a multilayered material sheet. Fabricating the material sheet can comprise coupling a plurality of non-overlapping material sections to form a single-layered material sheet. Fabricating the material sheet can comprise coupling one or more support layers to the single-layered material sheet.

In some embodiments, forming the shell comprises thermoforming the fabricated material sheet over a mold such that the plurality of sheet portions are formed into the plurality of shell portions.

In another aspect, a system for designing an orthodontic appliance for repositioning a patient's teeth in accordance with a treatment plan is provided. The system can comprise one or more processors and memory. The memory can comprise instructions executable by the one or more processors to cause the system to receive a 3D representation of a shell comprising a plurality of cavities shaped to receive the patient's teeth, the shell comprising a plurality of shell portions each positioned to engage a different subset of the patient's teeth. The instructions can cause the system to generate a 2D representation corresponding to the 3D representation of the shell, the 2D representation representing a material sheet to be used to form the shell, and the material sheet comprising a plurality of sheet portions corresponding to the plurality of shell portions.

In another aspect, a method for designing an orthodontic appliance for repositioning a patient's teeth is provided. The method can comprise determining a movement path to move one or more teeth from an initial arrangement to a target arrangement and determining a force system to produce movement of the one or more teeth along the movement path. The method can comprise determining an appliance geometry for an orthodontic appliance configured to produce the force system. The orthodontic appliance can comprise an outer shell comprising a plurality of teeth-receiving cavities and an inner structure positioned on an inner surface of the outer shell, the inner structure comprising a stiffness different than a stiffness of the outer shell such that the inner structure is configured to exhibit an amount of deformation greater than an amount of deformation exhibited by the outer shell. The method can comprise generating instructions for fabricating the orthodontic appliance having the appliance geometry using a direct fabrication technique.

In some embodiments, the direct fabrication technique comprises one or more of vat photopolymerization, material jetting, binder jetting, material extrusion, powder bed fusion, sheet lamination, or directed energy deposition and may be continuous direct fabrication process, multi-material direct fabrication, or other direct fabrication process. The instructions can be configured to cause a fabrication machine to form the outer shell concurrently with the inner structure.

In some embodiments, the method further comprises determining a material composition for one or more of the outer shell or the inner structure.

In another aspect, an appliance for placing attachments on teeth of a patient is provided. The appliance may include an attachment and a support. The support may comprise one or more coupling structures to hold the attachment. The appliance may also include one or more alignment structures coupled to the support to receive at least a portion of a tooth and position the attachment at a predetermined location on the tooth. The one or more coupling structures may be configured to release the attachment with removal of the alignment structure from the tooth.

In some embodiments, the alignment structure comprises at least a portion of a cavity of an aligner sized and shaped to receive the tooth and the support comprises a portion of an aligner extending from the portion of the cavity to a recess. The recess shaped to receive the attachment and comprising one or more coupling structures to hold the attachment, and wherein the at least the portion of the cavity of the aligner and the portion of the aligner extending from the at least the portion of the cavity to the recess have been directly fabricated together. Optionally, the one or more coupling structures comprise one or more extensions extending between the support and the attachment. The one or more extensions may absorb infrared light at a rate greater than that of the alignment structure.

In some embodiments, the application includes an adhesive on the attachment and may also include a cover on the adhesive. The cover may be capable of being removed from the adhesive.

In another aspect, a method of fabricating an appliance is provided. The method may include directly fabricating an aligner body including a support formed in a tooth-receiving cavity. The tooth receiving cavity may be configured to receive a tooth. The method may also include directly fabricating one or more coupling structures to the support and directly fabricating an attachment to the coupling structure. The aligner may be configured to align the attachment at a predetermined location on a tooth and the one or more coupling structures may be configured to release the attachment with removal of the aligner body from the tooth.

In some embodiments, the support, the aligner body, and the one or more coupling structures are directly fabricated together. Optionally, the alignment structure may comprise at least a portion of a cavity of an aligner sized and shaped to receive one or more teeth and the support may comprise a portion of an aligner including a recess shaped to receive the attachment. The recess may comprise the one or more coupling structures to hold the attachment and the aligner body, the one or more coupling structures, and the recess may be directly fabricated together.

In some embodiments, the one or more coupling structures are configured to break with removal of the alignment structure from the one or more teeth. Optionally, the one or more coupling structures may be sized and shaped to hold the attachment. The one or more coupling structures may be sized and shaped to hold the attachment with a gap extending between the support and the attachment.

In some embodiments, the one or more coupling structures comprise one or more extensions extending between the support and the attachment. The one or more coupling structures can include a separator sized and shaped to separate the attachment from the support. The one or more coupling structures can include a recess formed in the support, the recess sized and shaped to separate the attachment from the support.

In some embodiments, the method can include forming an adhesive structure on the attachment. Optionally, the method may include forming an adhesive on the one or more attachments, wherein the adhesive, the one or more coupling structures, the alignment structure, and the one or more attachment structures are directly fabricated together.

In some embodiments, the method may include forming a cover on the adhesive, the cover capable of removal from the adhesive. The cover, the adhesive, the support, the one or more coupling structures, the alignment structure, and the one or more attachment structures can be directly fabricated together. The one or more extensions can be formed with a material that absorbs infrared light at a rate greater than a rate of infrared absorption of the aligner body.

As used herein the term "and/or" is used as a functional word to indicate that two words or expressions are to be taken together or individually. For example, A and/or B encompasses A alone, B alone, and A and B together.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. In one embodiment, an appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using direct fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
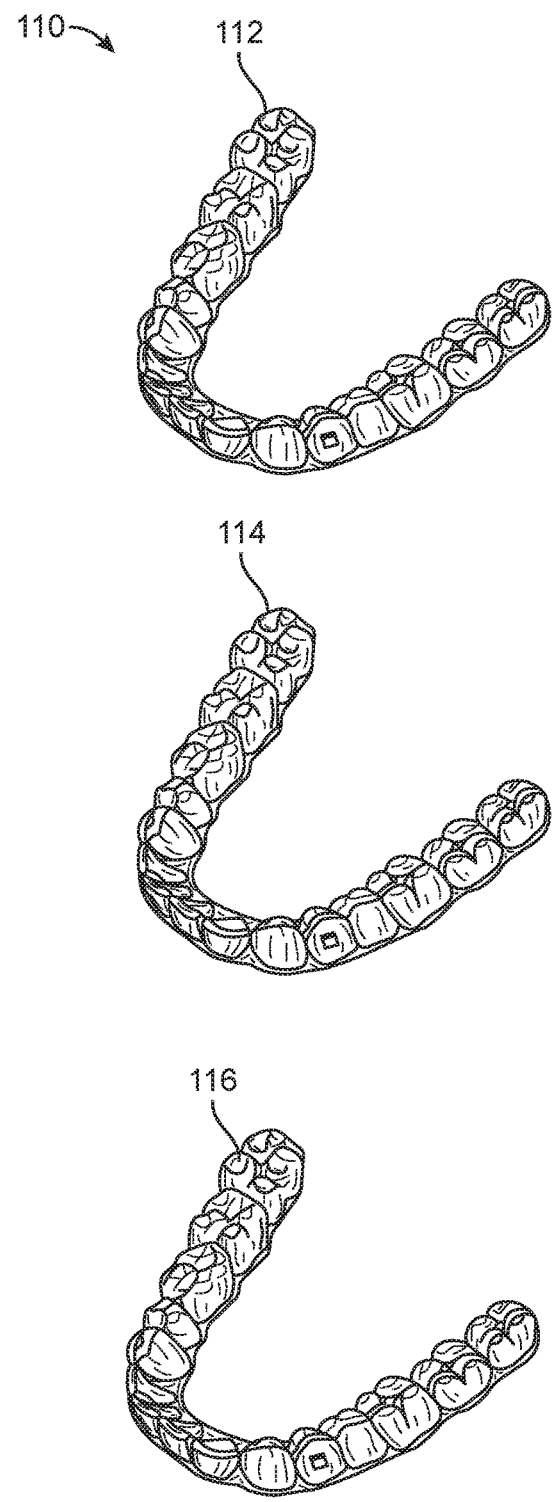
FIG. 1B illustrates a tooth repositioning system, in accordance with embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implant, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 2:
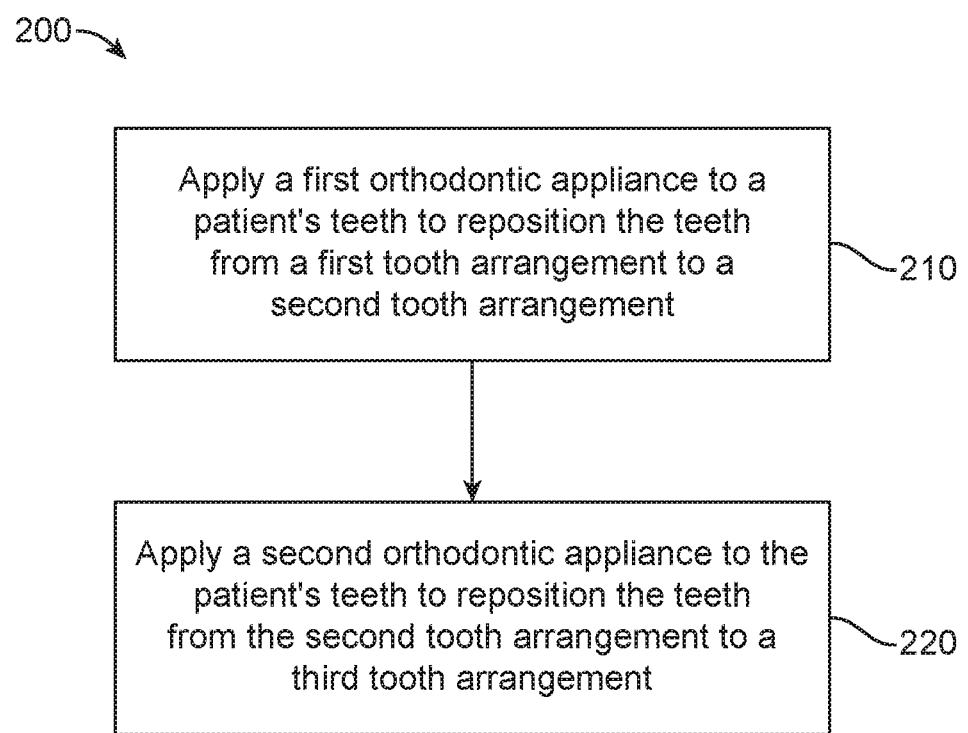
FIG. 2 illustrates a method of orthodontic treatment using a plurality of appliances, in accordance with embodiments.

FIG. 2 illustrates a method 200 of orthodontic treatment using a plurality of appliances, in accordance with many embodiments. The method 200 can be practiced using any of the appliances or appliance sets described herein. In step 210, a first orthodontic appliance is applied to a patient's teeth in order to reposition the teeth from a first tooth arrangement to a second tooth arrangement. In step 220, a second orthodontic appliance is applied to the patient's teeth in order to reposition the teeth from the second tooth arrangement to a third tooth arrangement. The method 200 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The ability of an orthodontic appliance to effectively treat a patient's teeth can depend on its properties, such as stiffness, elastic modulus, hardness, thickness, strength, or compressibility. For instance, these properties can influence the amount of force and/or torque that can be exerted by the appliance onto the teeth, as well as the extent to which such forces and/or torques can be controlled (e.g., with respect to location of application, direction, magnitude, etc.). The optimal properties for tooth repositioning may vary based on the type of tooth to be repositioned (e.g., molar, premolar, canine, incisor), movement type (e.g., extrusion, intrusion, rotation, torqueing, tipping, translating), targeted movement distance, use of tooth-mounted attachments, or combinations thereof. Different teeth in the patient's jaw may require different types of appliance properties in order to be effectively repositioned. In some instances, it can be relatively difficult to effectively reposition multiple teeth using an orthodontic appliance with uniform and/or homogeneous properties.

Accordingly, various embodiments of the present disclosure provide orthodontic appliances having properties that are heterogeneous and/or variable across different portions of appliance in order to allow for more effective repositioning of multiple teeth. In such embodiments, one or more portions of the appliance can have one or more properties that differ from those of one or more other portions, such as with respect to one or more of stiffness, elastic modulus, hardness, thickness, strength, compressibility, and the like. An appliance can include any number of portions with different properties, such as two, three, four, five, six, seven, eight, nine, ten, twenty, thirty, forty, fifty, or more portions with different properties. An appliance portion can include any part of an appliance, such as one or more tooth-receiving cavities or portions thereof. The size and location of an appliance portion can be varied as desired. For example, an appliance portion can be arranged to receive and/or engage a subset of the patient's teeth, such as a single tooth, a plurality of teeth, a portion of a tooth (e.g., a lingual, buccal, or occlusal surface), or combinations thereof. In some embodiments, appliance portions that receive different subsets of teeth (e.g., anterior teeth, posterior teeth, teeth to be repositioned, teeth to be retained in a current position) have different properties. Alternatively or in combination, appliance portions that engage different surfaces of the teeth (e.g., buccal surfaces, lingual surfaces, occlusal surfaces) can have different properties. The use of orthodontic appliances with variable localized properties can allow for improved control over the forces and/or torques to be applied to the patient's teeth, as described further herein.

In some embodiments, an orthodontic appliance with different localized properties is fabricated from a plurality of different materials. An appliance can be fabricated with one or more of many materials, such as plastics, elastomers, metal, glass, ceramics, reinforced fibers, carbon fiber, composites, reinforced composites, aluminum, biological materials, or combinations thereof. A material can be incorporated into an orthodontic appliance in any form, such as a layer, pad, strip, band, wire, mesh, scaffold, or combinations thereof. In some embodiments, an appliance can include at least two, three, four, five, six, seven, eight, nine, or ten different types of materials. Different material types may exhibit different properties (e.g., stiffness, elastic modulus, etc.). An appliance incorporating multiple materials can include different materials at different portions of the appliance so as to provide a desired combination of different localized properties. Exemplary methods for fabricating an appliance with multiple materials are described further herein.

Optionally, an orthodontic appliance may include only a single material type, but can vary the properties of the single material in order to achieve different localized properties. For example, different localized stiffness can be achieved by varying the thickness and/or the number of layers of the material at different appliance portions. Alternatively or in combination, the geometry of the material can be selectively altered at certain locations to modify the corresponding properties of the appliance at that location, e.g., selectively forming cuts or holes to reduce stiffness. These approaches can be used in combination with the multi-material approaches described herein, such that differing localized properties can be achieved by varying the material types used, as well as the properties of one or more material types.

In some embodiments, an orthodontic appliance includes at least one relatively stiff portion and at least one relatively compliant portion. "Stiff" or "relatively stiff" may be used herein to denote an appliance portion having a stiffness greater than a stiffness of another appliance portion, e.g., the rest of the appliance. "Compliant" or "relatively compliant" may be used herein to denote an appliance portion having a stiffness less than a stiffness of another appliance portion, e.g., the rest of the appliance. The appliances herein can be fabricated using one or more types of materials (e.g., synthetic materials such as plastics, ceramics, metals, composites; biological materials such as biological tissues, natural materials) with appropriate properties in order to provide the desired arrangement of stiff and compliant portions. For instance, the stiff portion(s) can be fabricated from one or more relatively stiff materials, and the compliant portion(s) can be fabricated from one or more relatively compliant materials. Examples of stiff materials include but are not limited to plastics, ceramics, metals, composites, or combinations thereof (e.g., a plastic filled with ceramic and/or reinforced with metal pieces). Examples of compliant materials include but are not limited to elastomers, rubbers, or rubber-like materials.

A stiff portion can have a greater elastic modulus than a compliant portion. In some embodiments, the stiff portion has an elastic modulus of about 1.5 GPa, or within a range from about 0.5 GPa to about 500 GPa. In some embodiments, the compliant portion has an elastic modulus of about 2 MPa, or within a range from about 0.2 MPa to about 500 MPa. Optionally, the elastic modulus of a stiff portion can be at least 10 times greater than the elastic modulus of a compliant portion. High modulus differences between layers can increase the sheer forces at the boundary between layers. In some embodiments, sheer between layers can be managed by using materials in adjacent layers that differ in elastic modulus by 10% or less. Alternatively or in combination, a stiff portion can have a greater thickness than a compliant portion. For example, the stiff portion can have a thickness of about 0.5 mm, or within a range from about 0.2 mm to about 1 mm. The compliant portion can have a thickness of about 0.3 mm, or within a range from about 0.05 mm to about 0.5 mm. Optionally, the thickness of a stiff portion can be at least 3 times greater than the thickness of a compliant portion.

The stiff and compliant portions can perform different functions in the orthodontic appliance. For example, the stiff portion can be used to generate the forces and/or torques for repositioning the teeth, e.g., by pressing against one or more areas of the teeth. In some embodiments, the appliance is shaped such that the stiff portion is deformed (e.g., changed in shape) and/or deflected (e.g., changed in position, orientation) when the appliance is worn on the teeth, and the resistance of the stiff material to the deformation and/or deflection generates forces and/or torques on the teeth that elicit tooth movements. The stiff portion can have sufficient stiffness such that different regions can be deformed and/or deflected with relative independence from each other (e.g., deformation and/or deflection of one region produces little or no corresponding deformation and/or deflection in adjacent regions). In some embodiments, the stiff portion is relatively resistant to deformation, such that the stiff portion may be deflected when the appliance is worn on the teeth, but exhibits little or no deformation. Optionally, the stiff portion can be relatively incompressible, such that it does not experience significant changes in shape (e.g., thickness) when the appliance is worn.

The compliant portion can be used to transmit the forces and/or torques generated by the stiff portion to the underlying teeth. For example, the compliant portion can be positioned between the stiff portion and the teeth (e.g., coupled to an inner surface of the stiff portion facing the teeth) in order to contact the teeth and distribute force and/or torque from the stiff portion to the teeth. In some embodiments, the compliant portion is designed to improve the transmission of force and/or torque to teeth compared to use of the stiff portion alone. For instance, the compliant portion can improve engagement between the appliance and the teeth, provide a more constant amount of force and/or torque, distribute the force and/or torque over a wider surface area, or combinations thereof. Optionally, the compliant portion can be relatively deformable (e.g., compressible) so as to exhibit significant changes in shape (e.g., thickness) when the appliance is worn.

The stiff and compliant portions of an orthodontic appliance can be designed in a variety of ways. In some embodiments, the stiff portion is an outer appliance shell having a plurality of cavities shaped to receive teeth, and the compliant portion includes one or more inner structures coupled to an inner surface of the shell (e.g., an inner surface of one or more tooth-receiving cavities). The compliant inner structure(s) can be removably coupled or permanently affixed to the outer shell (e.g., via adhesives, fasteners, bonding, etc.). As described herein, the stiffness of the stiff outer shell can be different from, e.g., greater than, the stiffness of the compliant inner structure.

The stiff outer shell can be shaped to generate one or more forces and/or torques in response to the appliance being worn on the patient's teeth. For instance, the outer shell can have an inner surface profile (e.g., an inner surface profile of one or more tooth-receiving cavities) that differs from the surface profile of one or more received teeth (e.g., received within the one or more tooth-receiving cavities. The inner surface profile of the outer shell can have a different position and/or orientation than the surface profile of the teeth, for example. Alternatively or in combination, the inner surface profile of the outer shell can include structures that do not match the tooth surface profile, such as protrusions extending towards the tooth or recesses extending away from the tooth. The discrepancies between the inner surface profile of the outer shell and the tooth surface profile can cause deflections and/or deformations of the outer shell that generate forces and/or torques that are exerted on the teeth.

The compliant inner structure can be positioned between the outer shell and one or more received teeth in order to distribute the forces and/or torques generated by the outer shell to the teeth. For example, the inner structure can deform in response to the forces and/or torques, e.g., by exhibiting a change in thickness and/or inner surface profile. Optionally, the inner structure can deform such that the inner surface profile conforms to the surface profile of the tooth, thus increasing the degree of engagement between the appliance and the tooth surface. This improved engagement can improve force and/or torque transmission from the outer shell to the tooth, e.g., by increasing the tooth surface area over which the force and/or torque is applied.

The use of a compliant inner structure to distribute force and/or torque from a stiff outer shell can reduce the sensitivity of the orthodontic appliance to variations in manufacturing tolerances. In some embodiments, the geometry of an appliance shell is configured to be different from the geometry of the patient's current tooth arrangement, and the engagement between the shell and the teeth resulting from this geometric mismatch, also referred to as "interference," results in forces and/or torques being exerted on the teeth. The magnitude of the force and/or torque may correlate with the extent of the interference of the shell geometry with the tooth geometry, such that portions of the appliance exhibiting larger amounts of interference apply greater amounts of force and/or torque, while portions exhibiting less interference or no interference apply less or no force and/or torque. Accordingly, the appliance geometry can be designed to exhibit certain amounts of interference with the teeth geometry in order to produce the desired forces and/or torques for repositioning the teeth. In embodiments where the appliance shell is relatively stiff, deviations from the planned appliance geometry (e.g., due to variations in manufacturing tolerance) can alter the amount of interference between the stiff shell and the tooth, which in turn can alter the amount of force and/or torque that is actually applied to the tooth.

The use of a compliant structure with a stiff shell can reduce the sensitivity of the appliance geometry to such variations. In some embodiments, compared to stiffer structures, compliant structures are less susceptible to fluctuations in applied force and/or torque due to manufacturing tolerances. For example, the amount of force and/or torque applied to the tooth by a compliant structure can be less dependent on the degree of interference between the compliant structure and the tooth, e.g., due to the lower stiffness of the compliant structure. In order to produce the same level of force as an entirely stiff appliance, the appliances with compliant structures herein can be designed with an increased amount of interference with the teeth geometry. Accordingly, orthodontic appliances incorporating compliant structures can produce more consistent and reproducible force and/or torque application on teeth. Additionally, such compliant structures can provide more constant force application onto the teeth as they move during treatment.

FIGS. 3A and 3B illustrate a portion 300 of an orthodontic appliance including a stiff outer shell 302 and a compliant inner structure 304, in accordance with embodiments. FIG. 3A illustrates the appliance portion 300 prior to being placed on the patient's teeth, such that the outer shell 302 and inner structure 304 are both in a free standing unloaded configuration, and the shape profiles of the outer shell 302 and inner structure 304 are undistorted. For example, the compliant inner structure 304 (depicted herein as a layer) can have an initial thickness profile 306 and the stiff outer shell 302 can have an initial thickness profile 307. In some embodiments, the undistorted shape profile of the outer shell 302 and/or inner structure 304 can correspond to a 3D shape profile of a tooth in an unloaded position and/or orientation prior to being received within the appliance portion 300.

FIG. 3B illustrates the appliance portion 300 after being placed on the patient's teeth. The portion 300 can engage a tooth 308, such that the inner surface of the inner structure 304 contacts a surface of the tooth 308. The inner surface profiles of the inner structure 304 and outer shell 302 can differ from the surface profile of the tooth 308, such that the appliance portion 300 presses against and applies force to the tooth 308 when the appliance is worn. The stiff outer shell 302 can be sufficiently stiff such that it experiences little or no deformation when pressed against the tooth 308, e.g., the thickness profile 307 is substantially unchanged.

In contrast, the compliant inner structure 304 is sufficiently compliant such that it is deformed when pressed against the tooth 308. In some embodiments, the compliant inner structure 304 exhibits an amount of deformation greater than the amount of deformation exhibited by the outer shell when the appliance is worn on the patient's teeth. Accordingly, when the appliance portion 300 is worn by the patient, the inner structure 304 can assume a loaded configuration different from the unloaded configuration (e.g., with respect to a thickness profile, cross-sectional shape, and/or inner surface profile of the inner structure 304). For example, the inner structure 304 can be compressed between the stiff outer shell 302 and the tooth 308 so as to exhibit an altered (e.g., reduced) thickness profile 310 at the engagement area. In some embodiments, portions of the inner structure 304 near the engagement region between the inner structure 304 and tooth 308 are squeezed outward away from the engagement region, such that the thickness profile, inner surface profile, and cross-sectional shape of the inner structure 304 is changed relative to the unloaded configuration. The distorted shaped profile can correspond to the 3D shape profile of the tooth 308 when in a received position and/or orientation within the appliance portion 300. The change in the thickness profile of the inner structure 304 can correspond to the difference between the unloaded position and/or orientation of the tooth 308 and the received position and/or orientation of the tooth 308. Optionally, the inner structure 304 can deform so as to conform to the tooth surface profile at the engagement area. The stiffness of the outer shell 302 can result in generation of force and/or torque on the tooth 308, while the compliance of the inner structure 304 can allow for improved engagement between the appliance portion 300 and the tooth 308 in order to distribute the generated force and/or torque to the tooth 308.

The compliant inner structures described herein can be provided in various forms, such as a layer, pad, strip, band, wire, mesh, scaffold, or combinations thereof. The inner structure can be formed by milling, etching, coating, jetting, printing, bonding, spraying, extrusion, deposition, or combinations thereof, as described further herein. In some embodiments, the inner structure is a single continuous structure, such as a layer. For example, the inner structure can be a continuous layer that overlaps the inner surface of the stiff outer shell. The compliant inner layer can span some or all of the plurality of cavities of the outer shell. In such embodiments, the orthodontic appliance can be considered a multilayered appliance having a stiff outer layer, and a compliant inner layer.

FIG. 3C illustrates an appliance portion 320, having a compliant tooth facing or inner structure 324 (depicted herein as a layer) and a compliant outer structure 326 while having a stiff middle layer 322, also called a shell. The portion 320 can engage a tooth, such that the inner surface of the inner structure 324 contacts a surface of the tooth. The inner surface profiles of the inner structure 324 and middle shell 322 can differ from the surface profile of the tooth, such that the appliance portion 320 presses against and applies force to the tooth when the appliance is worn. The stiff middle shell 322 can be sufficiently stiff such that it experiences little or no deformation when pressed against the tooth, e.g., the thickness profile is substantially unchanged.

In contrast, the compliant inner structure 324, like the inner structure 304, is sufficiently compliant such that it is deformed when pressed against the tooth. In some embodiments, the compliant inner structure 324 exhibits an amount of deformation greater than the amount of deformation exhibited by the middle shell 322 when the appliance is worn on the patient's teeth. Accordingly, when the appliance portion 320 is worn by the patient, the inner structure 324 can assume a loaded configuration different from the unloaded configuration (e.g., with respect to a thickness profile, cross-sectional shape, and/or inner surface profile of the inner structure 324). For example, the inner structure 324 can be compressed between the stiff middle shell 322 and the tooth so as to exhibit an altered (e.g., reduced) thickness profile at the engagement area. In some embodiments, portions of the inner structure 324 near the engagement region between the inner structure 324 and tooth are squeezed outward away from the engagement region, such that the thickness profile, inner surface profile, and cross-sectional shape of the inner structure 324 is changed relative to the unloaded configuration. The distorted shaped profile can correspond to the 3D shape profile of the tooth when in a received position and/or orientation within the appliance portion 320. The change in the thickness profile of the inner structure 324 can correspond to the difference between the unloaded position and/or orientation of the tooth and the received position and/or orientation of the tooth. Optionally, the inner structure 324 can deform so as to conform to the tooth surface profile at the engagement area. The stiffness of the middle shell 322 can result in generation of force and/or torque on the tooth, while the compliance of the inner structure 324 can allow for improved engagement between the appliance portion 320 and the tooth in order to distribute the generated force and/or torque to the tooth and to reduce sensitivity of the force and torque magnitudes due to manufacturing tolerances. For example interference between the aligner and the teeth cause the torques and forces involved in moving the teeth. The elasticity of the aligner material and the stiffness of the aligner causes these forces. Small differences in the manufactured shape of an application as compared to the desired shape of the application can cause deviations from the desired forces and torques imparted on the teeth. With a stiff aligner, errors in manufacturing magnified as compared to a more compliant aligner. Adding a compliant inner structure can reduce the sensitivity of the force and torque magnitudes due to manufacturing tolerances while still maintaining many of the advantages of a stiff aligner, such as the ability to impart higher forces and torques on teeth.

The addition of a compliant outer structure 326 may provide a more comfortable experience for a patient as the compliant outer structure 326 may deform upon contact with the gingiva, soft palate, hard palate, cheeks, and other portions of the patient's mouth.

Figure 4A:
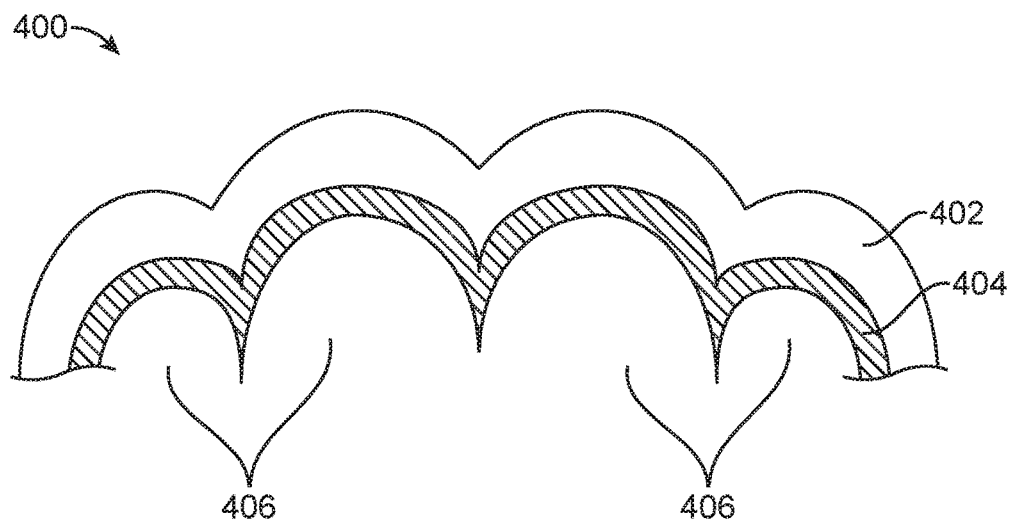
FIG. 4A illustrates a cross-section of a three-layer orthodontic appliance with a stiff outer layer and a compliant inner layer, in accordance with embodiments.

FIG. 4A illustrates a cross-section of an orthodontic appliance 400 with a stiff outer layer 402 and a compliant inner layer 404, in accordance with embodiments. The outer layer 402 forms a shell with a plurality of cavities 406 for receiving a patient's teeth, as described herein. The inner layer 404 is coupled to an inner surface of the outer layer 402, such that the inner layer 404 overlaps some or all of the cavities and is positioned between the outer layer 402 and the received teeth. In some embodiments, when the appliance 400 is worn on the teeth, the received teeth contact the inner layer 404 and do not directly contact the outer layer 402.

The properties of the inner and outer layers can be varied as desired. In some embodiments, the inner and outer layers have the same thickness, while in other embodiments, the inner and outer layers have different thicknesses. For instance, the thickness of the outer layer can be about 0.5 mm, or within a range from about 0.1 mm to about 2 mm, and the thickness of the inner layer can be about 0.5 mm, or within a range from about 0.1 mm to about 2 mm. Optionally, the total thickness of the appliance including both the outer layer and inner layer can be less than or equal to about 0.8 mm (e.g., in order to avoid causing open bite if the appliance covers the occlusal areas of tooth crowns). In some embodiments, each layer has a uniform thickness, while in other embodiments, one or more of the layers can have a non-uniform thickness (e.g., different layer portions have different thicknesses).

In some embodiments, the inner and/or outer layer can include a force modifying structure that modulates the localized force and/or torque applied to a specified location on the patient's teeth, either directly (e.g., by direct contact with the tooth surface) or indirectly (e.g., via contact with an attachment mounted on the tooth). A force modifying structure can include any structural feature that produces an alteration in a force and/or torque applied to the teeth, such as a thickened portion, a thinned portion, a protrusion (e.g., ridge, dimple, and indentation), a recess, an aperture, a gap, or combinations thereof. For example, a thickened portion or a protrusion that is compressed by the tooth when the appliance is worn can produce a localized increase in force and/or torque. A thinned portion or a recess can exhibit reduced contact with the tooth and thus produce a localized decrease in force and/or torque. The use of force modifying structures as described herein allow for increased control over force and/or torque application at specified locations on the teeth.

An appliance can include any number and combination of force modifying structures situated on the inner and/or outer layers. In some embodiments, the force modifying structure is located on only the inner layer or only the outer layer, such that the two layers have different geometries. For example, the inner layer can include one or more portions of increased thickness that are designed to preferentially engage the tooth in order to apply force and/or torque. Alternatively or in combination, the inner layer can include one or more portions of decreased thickness that reduce localized engagement of the appliance with the tooth. As another example, the outer layer can be formed with one or more protrusions extending into the tooth receiving cavity in order to engage and apply force and/or torque to the tooth. Alternatively or in combination, the outer layer can be formed with one or more recesses or gaps to reduce the amount of force and/or torque that would be applied. Optionally, the layer that does not include the force modifying structure can have a uniform thickness.

Figure 4B:
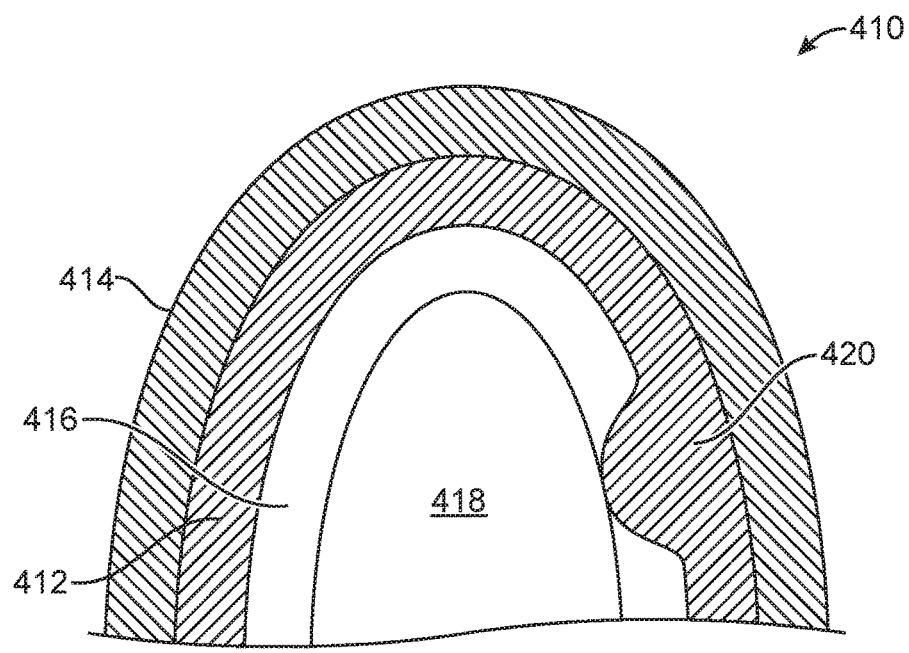
FIG. 4B illustrates a cross-section of an orthodontic appliance having a compliant inner layer with a thickened portion, in accordance with embodiments.

FIG. 4B illustrates a cross-section of an orthodontic appliance 410 having a compliant inner layer 412 with a thickened portion 420, in accordance with embodiments. The inner layer 412 is coupled to an inner surface of a stiff outer layer 414 so as to define a cavity 416 shaped to receive a tooth 418. The outer layer 414 can have a uniform thickness. The inner layer 412 can include at a force modifying structure, such as at least one layer portion 420 with increased thickness relative to the other portions of the inner layer 412. The thickened portion 420 can be positioned to engage the received tooth 418. Due to the increased thickness of the layer portion 420, when the tooth 418 is received within the cavity 416, the portion 420 may be pressed by the tooth 416 against the stiff outer layer 414. This arrangement can result in forces and/or torques being applied to the tooth 418 primarily at the thickened layer portion 420. Multiple thickened portions can be included in the inner layer 412 in order to facilitate force and/or torque application at multiple different portions of the tooth 418. Although FIG. 4B illustrates an inner layer 412 with a non-uniform thickness and an outer layer with a uniform thickness, one of skill in the art would appreciate that other embodiments can incorporate an outer layer with a non-uniform thickness and an inner layer with uniform thickness. In alternative embodiments, both the inner and outer layers can have non-uniform thicknesses.

Figure 4C:
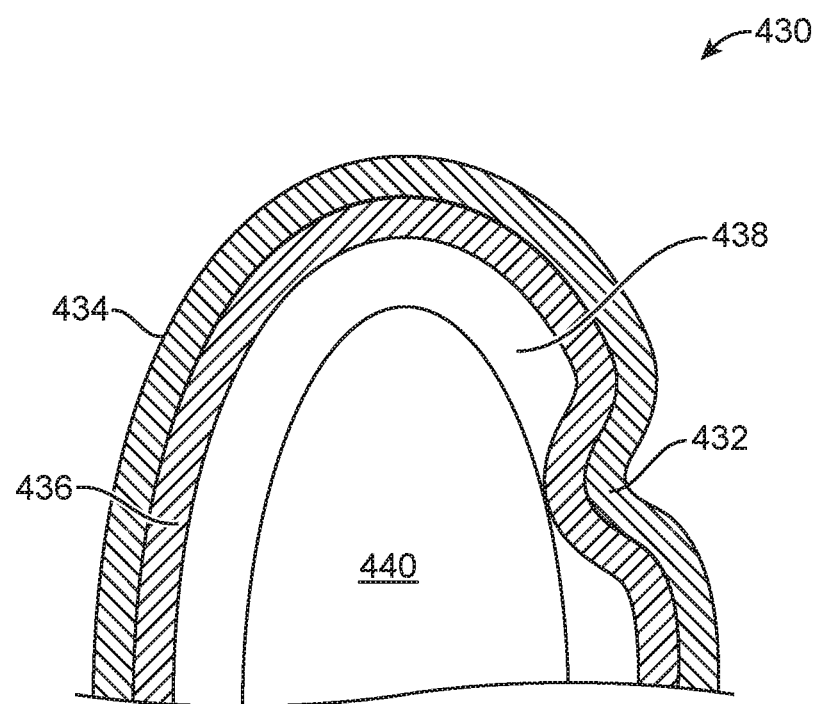
FIG. 4C illustrates a cross-section of an orthodontic appliance including a protrusion formed in the stiff outer layer, in accordance with embodiments.

FIG. 4C illustrates a cross-section of an orthodontic appliance 430 including a protrusion 432 formed in the stiff outer layer 434, in accordance with embodiments. Similar to other embodiments herein, the appliance 430 can include a stiff outer layer 434 coupled to a compliant inner layer 436 so as to define a cavity 438 shaped to receive a tooth 440. The outer layer 434 and the inner layer 436 can both have uniform thicknesses. In some embodiments, the stiff outer layer 434 includes a force modifying structure, such as a protrusion 432 extending inwards into the cavity 438 towards the tooth 440. The inner layer 436 can conform to the inner surface profile of the outer layer 434 including the protrusion 432. The protrusion 432 can press against the surface of the received tooth 440 so as to apply forces and/or torques to the tooth. Optionally, the appliance 430 can include multiple protrusions 432 in the outer layer 434 in order to facilitate force and/or torque application at multiple different portions of the tooth 440. Although FIG. 4C illustrates a protrusion 432 in the outer layer 434, one of skill in the art would appreciate that other embodiments can include a protrusion in the inner layer, or protrusions in both layers.

In some embodiments, the stiff outer layer and compliant inner layer are removably coupled to each other, such that the outer and inner layers can be separated from each other without damaging the appliance. The removable coupling can be a snap fit or interference fit, for example. In such embodiments, the inner layer can be considered to be an inner shell and the outer layer can be considered to be an outer shell, with the two shells being separable from each other. To assemble the appliance, the inner shell can be placed on the patient's teeth, followed by placement of the outer shell over the inner shell and onto the teeth. Alternatively, the inner shell can be inserted into the outer shell, and the assembled appliance placed onto the teeth as a single component. The use of removably coupled inner and outer shells allows for a treatment system in which a single inner shell is used with multiple outer shells, a single outer shell is used with multiple inner shells, or combinations thereof. The inner and/or outer shell to be used can vary based on the specific treatment stage, such that the patient wears different combinations of shells throughout the course of treatment.

Figure 4D:
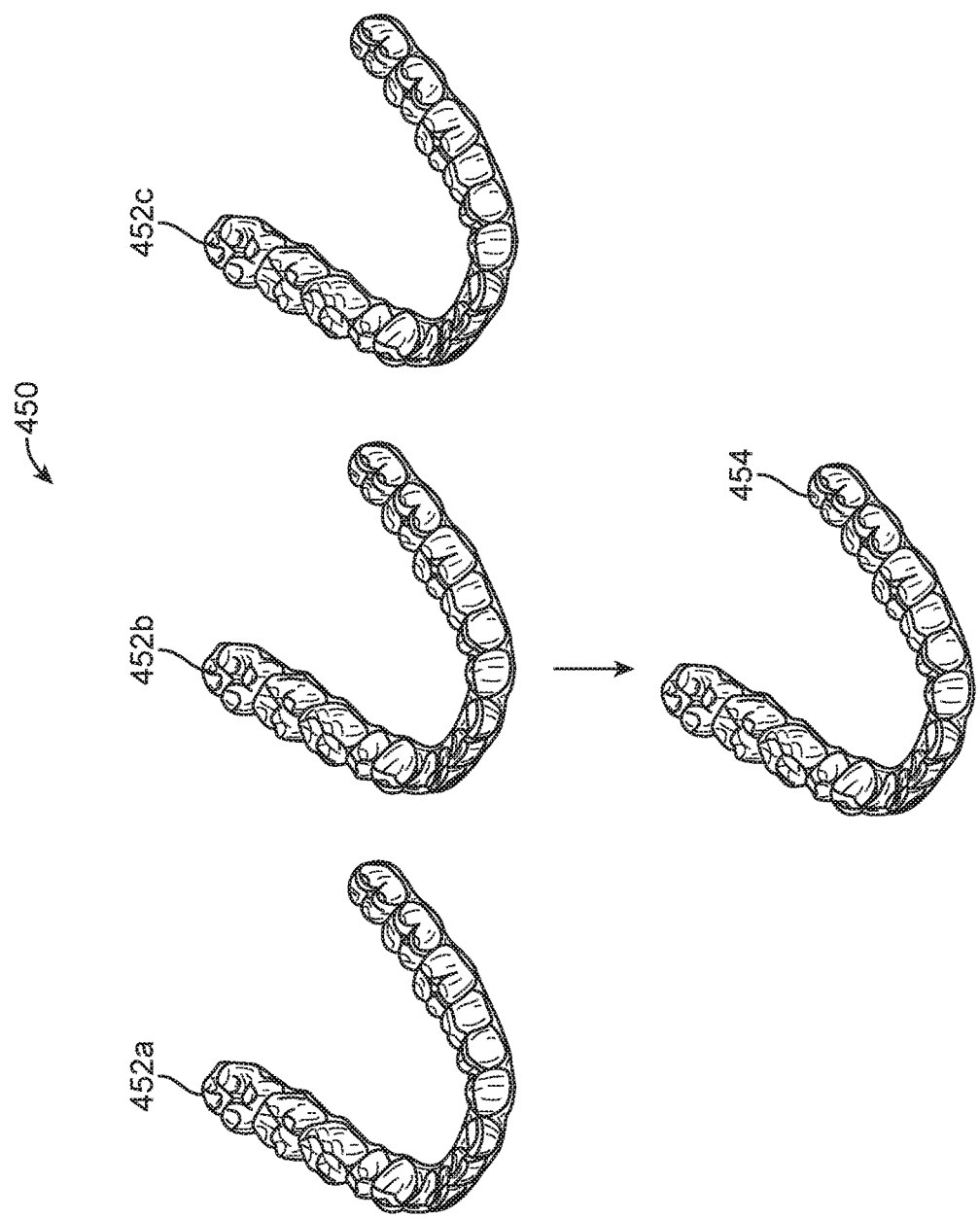
FIG. 4D illustrates a treatment system including a plurality of stiff outer shells to and a single compliant inner shell, in accordance with embodiments.

FIG. 4D illustrates a treatment system 450 including a plurality of stiff outer shells 452a-c and a single compliant inner shell 454, in accordance with embodiments. A single outer shell can be worn over the inner shell 454 in order to form an orthodontic appliance. The stiff outer shells 452a-c can be shaped to generate tooth repositioning forces and/or torques, while the compliant inner shell 454 can serve primarily as a liner that engages the teeth to distribute the generated force and/or torque to the teeth. In some embodiments, each outer shell corresponds to a different treatment stage of a treatment plan, such that the outer shells 452a-c are sequentially worn in order to reposition the teeth according to the treatment plan. For instance, the cavity geometries of each outer shell can be shaped according to the particular tooth arrangement to be achieved with the corresponding treatment stage. The inner shell 454 can be reusable between treatment stages, such that the patient can progress to the next stage simply by exchanging the current outer shell for the next one in the sequence while maintaining the same inner shell 454. In alternative embodiments, a plurality of compliant inner shells can be used with a single reusable stiff outer shell, with each compliant inner shell corresponding to a different treatment stage. One of ordinary skill in the art would appreciate that an orthodontic treatment system can include any combination of reusable outer and inner shells that are combined with non-reusable inner and outer shells, respectively, to enable a desired course of treatment.

In some embodiments, the stiff outer layer and compliant inner layer are permanently affixed to each other, such that the layers cannot be separated without damaging the appliance. The benefits of this approach include easier handling and avoiding curling or incorrect positioning of the inner layer when worn under the outer layer. An orthodontic treatment plan can involve sequentially applying a plurality of different multilayered appliances in order to reposition the patient's teeth. Optionally, a treatment plan can include some stages where appliances with permanently affixed layers are used and some stages where appliances with separable shells are used.

Alternatively or in combination with the layer-based approaches presented herein, a compliant inner structure of an orthodontic appliance can include a plurality of discrete structures that are coupled to certain portions of the outer shell. Examples of such structures include but are not limited to pads, plugs, balloons, bands, springs, scaffolds, meshes, or combinations thereof. The appliance can include any number of discrete compliant structures positioned at any suitable location in the shell. The use of one or more discrete inner structures located at different portions of the appliance enables forces and/or torques to be controllably applied to selected portions of the teeth. The positioning, geometries (e.g., shape, size), and properties (e.g., stiffness, elastic modulus) of the discrete structure can be varied as desired in order to achieve a desired force and/or torque distribution on the teeth.

FIG. 5A illustrates an appliance 500 with a plurality of discrete pad structures 502 coupled to an inner surface of an outer shell 504, in accordance with embodiments. Similar to other embodiments herein, the outer shell 504 defines a tooth-receiving cavity for a tooth 506. The plurality of discrete pad structures 502 are positioned between the outer shell 504 and tooth 506 so as to engage the tooth 506. The pad structures 502 may be solid. Alternatively, the pad structures 502 may be hollow, as discussed further herein. In some embodiments, each pad structure 502 engages a different portion of the tooth 506, such as a different tooth surface (e.g., buccal, lingual, or occlusal surface). The discrete pad structures 502 can be configured to transmit forces and/or torques generated by the outer shell 504 to the different portions of the tooth 506. In some embodiments, the pad structures 502 are formed by printing or spraying onto the inner surface of the outer shell 504. Optionally, the pad structures 502 can be formed separately from and coupled to the outer shell 504, e.g., using adhesives, fasteners, etc. In some embodiments, the pad structures 502 and outer shell 504 are formed using direct fabrication, as discussed further herein.

FIG. 5B illustrates an appliance 520 with a plurality of discrete plug structures 522 extending through an outer shell 524, in accordance with embodiments. The appliance 520 is similar to the appliance 500, except that the discrete plug structure 522 each include an outer portion that extends through the thickness of the outer shell 524. In some embodiments, the discrete plug structures 522 are formed separately from and coupled to the outer shell 524, e.g., using adhesives, fasteners, etc. Optionally, the discrete plug structures 522 can be coupled to the shell 524 using mechanical retention (e.g., interference fits, snap fits) without adhesives or other attachment elements. The use of mechanical retention can allow for increased flexibility in the geometry of the discrete plug structures 522. For example, the discrete plug structures 522 can be hollowed out (e.g., to control stiffness) without interfering with their ability to couple to the outer shell 524. In some embodiments, the plug structures 522 and outer shell 524 are formed using direct fabrication, as discussed further herein.

FIG. 5C illustrates an appliance 540 with a plurality of discrete hollow or inflatable structures 542, in accordance with embodiments. The inflatable structure 542 can be a hollow balloon or bladder that can be filled with a fluid, such as a liquid or a gas. The fluid pressure can be used to control the amount of force and/or torque applied to the received tooth 546 by the appliance 540. Optionally, the fluid can be maintained at a substantially constant pressure so as to allow for substantially constant force and/or torque application on the tooth 546. Alternatively, the fluid pressure can be as desired to produce variable force and/or torque application on the tooth 546.

FIG. 5D illustrates an exemplary load-displacement curve 560 for an appliance, in accordance with embodiments. The load-displacement curve 560 exhibits a relatively flattened region 562 in which the force or torque in the appliance is substantially constant, e.g., does not vary substantially with increasing displacement. In some embodiments, substantially constant means that the force or torque does not vary by more than 5%, 10%, 20%, 30%, 40%, or 50% of the maximum value of the force or torque over the displacement range of interest. The use of discrete compliant inner structures as described herein can allow for application of substantially constant forces and/or torques, which can improve the reliability and consistency of orthodontic treatment with appliances. For example, as described herein with respect to FIG. 5C, one or more structures can be filled with a fluid maintained at a substantially constant pressure in order to apply substantially constant force and/or torque to teeth. Alternatively or in combination, a discrete pad structure can be fabricated in a shape and/or from an appropriate material to produce substantially constant force and/or torque over a relatively large range of deflections and/or deformations without yielding (e.g., polyolefins or shape memory alloys such as NiT or Cu—Al—Ti).

Figure 5E:
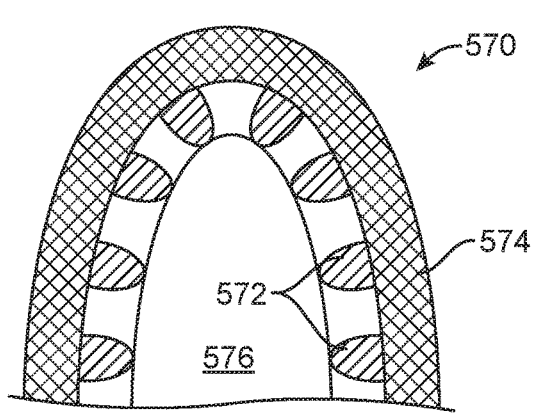
FIG. 5E illustrates an appliance with a plurality of discrete pad structures, in accordance with embodiments.

FIG. 5E illustrates an appliance 570 with a plurality of discrete pad structures 572 coupled to an inner surface of an outer shell 574, in accordance with embodiments. Similar to other embodiments herein, the outer shell 574 defines a tooth-receiving cavity for a tooth 576. The plurality of discrete pad structures 572 are positioned between the outer shell 574 and tooth 576 so as to engage the tooth 576. The pad structures 572 may be solid. Alternatively, the pad structures 572 may be hollow, as discussed further herein. In some embodiments, each pad structure 572 engages a different portion of the tooth 576, such as a different tooth surface (e.g., buccal, lingual, or occlusal surface). The discrete pad structures 572 can be configured to transmit and distribute forces and/or torques generated by the outer shell 574 to the different portions of the tooth 576. In some embodiments, the pad structures 572 are distributed about the surface of the outer shell 574 such that they distribute the repositioning forces from the outer shell 574 onto the tooth 576. In some embodiments, the pad structures 572 are formed by printing or spraying onto the inner surface of the outer shell 574. Optionally, the pad structures 572 can be formed separately from and coupled to the outer shell 574, e.g., using adhesives, fasteners, etc. In some embodiments, the pad structures 572 and outer shell 574 are formed using direct fabrication.

Figure 5F:
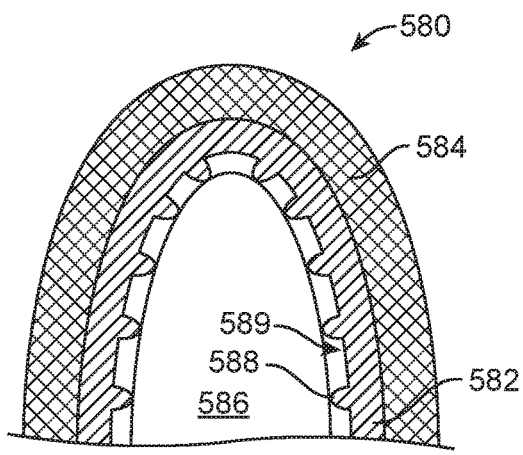
FIG. 5F illustrates an appliance with a plurality of connected pad structures, in accordance with embodiments.

FIG. 5F illustrates an appliance 580 with a compliant layer 582 coupled to an inner surface of an outer shell 574. The compliant layer 582 includes a plurality of pad structures 588, in accordance with embodiments. Similar to other embodiments herein, the outer shell 584 defines a tooth-receiving cavity for a tooth 586. The plurality of pad structures 588 are positioned on the compliant layer 582 and between the outer shell 584 and tooth 586 so as to engage the tooth 586. The compliant layer 582 and pad structures 588 may be solid. In some embodiments, the compliant layer 582 and the pad structures 588 may be a single, integral structure. In some embodiments, the compliant layer 582 and pad structures 588 may be discrete structures. In some embodiments, the pad structures 588 and compliant layer 582 may be hollow. In some embodiments, each pad structure 588 engages a different portion of the tooth 586, such as a different tooth surface (e.g., buccal, lingual, or occlusal surface). The pad structures 588 can be configured to transmit and distribute forces and/or torques generated by the outer shell 584 to the different portions of the tooth 586. In some embodiments, the pad structures 588 are distributed about the compliant structure 582 such that they distribute the repositioning forces from the outer shell 584 onto the tooth 586. In some embodiments, the pad structures 588 are formed by printing or spraying onto the inner surface of the outer shell 584. Optionally, the pad structures 588 and compliant structure 582 can be formed separately from and coupled to the outer shell 584, e.g., using adhesives, fasteners, etc. In some embodiments, the pad structures 588, compliant structure 582, and outer shell 584 are formed using direct fabrication.

Figure 5G:
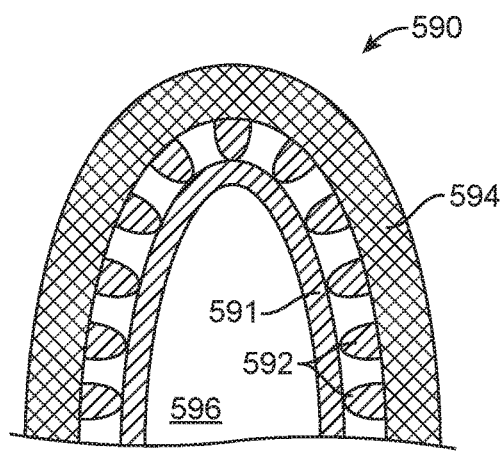
FIG. 5G illustrates an appliance with a plurality of discrete pad structures, in accordance with embodiments.

FIG. 5G illustrates an appliance 590 with a plurality of discrete pad structures 592 coupled to an inner surface of an outer shell 594 and an inner surface of an inner shell 591, in accordance with embodiments. The inner surface of the shell 591 defines a tooth-receiving cavity for a tooth 596. The plurality of discrete pad structures 592 are positioned between the outer shell 594 and the inner shell 591 and modulate the engagement of the inner shell 591 with the tooth 596. The pad structures 592 distribute the repositioning forces of the outer shell 594 onto the inner shell 591 which transmits the forces onto the tooth 596. The pad structures 592 may be solid. Alternatively, the pad structures 592 may be hollow, as discussed further herein. The discrete pad structures 592 can be configured to transmit forces and/or torques generated by the outer shell 574 to the different portions of the inner shell 591 and the tooth 576. In some embodiments, the pad structures 592 are formed by printing or spraying onto the inner surface of the outer shell 594. In some embodiments, the pad structures 592 are formed by printing or spraying onto the surface of the inner shell 591. Optionally, the pad structures 592 can be formed separately from and coupled to the outer shell 594 or the inner shell 591, e.g., using adhesives, fasteners, etc. In some embodiments, the pad structures 592, inner shell 591, and outer shell 594 are formed using direct fabrication.

Figure 5H:
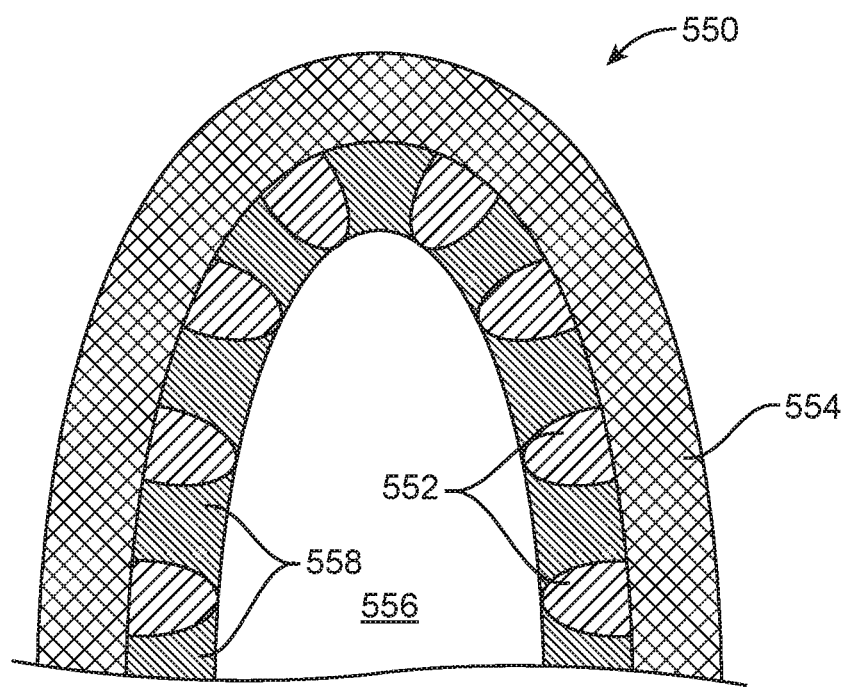
FIG. 5H illustrates an appliance with a plurality of discrete pad structures, in accordance with embodiments.

FIG. 5H illustrates an appliance 550 with a plurality of discrete pad structures 552 coupled to an inner surface of an outer shell 554 which defines a tooth-receiving cavity for a tooth 556, similar to the embodiment shown in FIG. 5E. Additional, the appliance 550 includes a filling material 558 between the pad structures 552. This filling material 558 may be relatively compliant material such that it imparts very little force or torque on the teeth, for example, it may have an elastic modulus that is ½ or ¹⁄₁₀ of the elastic modulus of the pad structures and/or the outer shell 554. In some embodiments, the filling material 558 extremely soft, for example, in some embodiments the filling material 558 may be a viscus fluid, such as a gel, with a thin, stiff outer surface or cover over the filling material on the tooth facing surface. In some embodiments, the filling material may have an elastic modulus of ¹⁄₂₀ or even ¹⁄₁₀₀ of the elastic modulus of the pad structures.

In some embodiments, the filling material 558 is chosen based on its optical properties. For example, the index of refraction of the filling material 558 may match the index of refraction of the pad structures. In some embodiments, matching the index of refraction includes matching it such that the pad structures 552 are not readily observable on a patient during normal use. In some embodiments, the index of refraction of the filling material 558 is within 10% of the index of refraction of the pad structures 552.

Some embodiments of the compliant inner structures described herein directly contact the tooth surface in order to transmit forces and/or torques. In other embodiments, rather than directly contacting the tooth surface, the compliant inner structure engages the tooth indirectly via one or more attachments mounted to the tooth surface. The geometry and location of the inner structure and/or attachment can be designed to produce a specified force and/or torque when the appliance is worn on the teeth. The use of attachments can be beneficial for improving control over the applied force and/or torque, as well as to elicit tooth movements that would otherwise be difficult to produce with an appliance shell only. An appliance can include any number of inner structures configured to engage a corresponding number of attachments mounted on the patient's teeth.

Figure 6A:
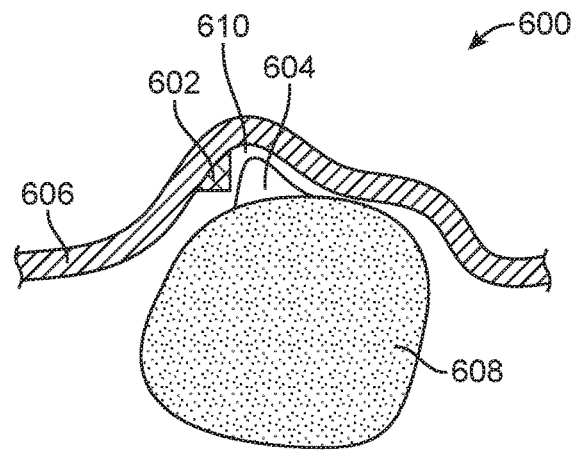
FIG. 6A illustrates an appliance including an inner structure engaging a tooth-mounted attachment, in accordance with embodiments.

FIG. 6A illustrates an appliance 600 including an inner structure 602 engaging a tooth-mounted attachment 604, in accordance with embodiments. The inner structure 602 can be a compliant discrete pad element coupled to an inner surface of a stiff outer shell 606, as described herein. When the appliance 600 is worn by the patient, the inner structure 602 can contact an attachment 604 affixed to a received tooth 608, thus transmitting forces and/or torques produced by the outer shell 606 to the tooth 608 via the attachment 604. Optionally, the stiff outer shell 606 can include a recess 610 shaped to receive and accommodate the attachment 604 when engaged with the inner structure 602. In some embodiments, the attachment 604 is stiffer than the inner structure 602, such that the inner structure 602 is compressed between the outer shell 606 and the attachment 604. The inner structure 602 can exhibit spring-like resistance to the compression to exert force onto the attachment 604 that is transmitted to the underlying tooth 608. This approach can provide tooth repositioning forces with greater reproducibility.

Various embodiments herein provide a compliant inner structure that is coupled to the stiff outer shell, and not to a tooth or an attachment. Alternatively, the inner structure can be coupled to a tooth surface or an attachment affixed to a tooth surface, and not to the outer shell. In some embodiments, an inner structure mounted on a tooth can be considered to be a compliant attachment. The geometry and location of the compliant attachment can be designed to engage the stiff outer shell in order to transmit forces and/or torques generated by the stiff outer shell to the underlying tooth.

Figure 6B:
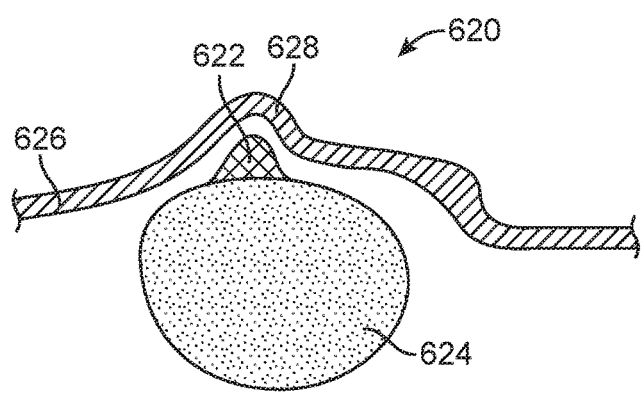
FIG. 6B illustrates an appliance including a compliant tooth-mounted attachment, in accordance with embodiments.

FIG. 6B illustrates an appliance 620 including a compliant tooth-mounted attachment 622, in accordance with embodiments. The compliant attachment 622 is mounted on a surface of a tooth 624 received within a cavity defined by a stiff outer shell 626 of the appliance 620. The stiff outer shell 626 can include a recess 628 accommodating the compliant attachment 622. When the appliance 620 is worn over the patient's teeth, the stiff outer shell 626 can engage the attachment 622, and the attachment 622 can distribute the forces and/or torques produced by the stiff outer shell 626 to the underlying tooth 624. The use of a compliant attachment 622 can provide improved control over the amount of force and/or torque exerted on the tooth 624 compared to stiff attachments.

In some embodiments, a compliant inner structure can be provided with a protective layer to reduce wear. The protective layer can be formed as a material layer or as a coating deposited on the compliant inner structure. The protective layer can have a greater stiffness and/or hardness than the inner structure in order to protect the inner structure against abrasion. In some embodiments, the protective layer is formed on one or more exposed surfaces of the compliant inner structure, such as an exposed surface that is arranged to engage a relatively stiff and/or hard object. For instance, for a compliant inner structure coupled to an inner surface of a stiff outer shell, the protective layer can be formed on a surface of the inner structure that engages a received tooth or attachment. As another example, for a compliant inner structure coupled to a tooth or tooth-mounted attachment, the protective layer can be formed on a surface of the inner structure that engages a stiff outer shell. This approach may be particularly beneficial for compliant structures that are mounted on a tooth surface (e.g., compliant attachment) or attachment surface, since such structures are more likely to be subjected to abrasive forces associated with jaw movements such as chewing.

In some embodiments, a stain resistant protective layer may be formed on a surface of the aligner. The stain resistant protective layer may be an impermeable or semi-permeable layer that resists staining from fluids, such as coffee and soda, food, and other things.

In some embodiments, a biological compatible layer is provided on an external portion of the aligner. For example, some patients may have a sensitivity, such as an allergy, to certain materials, such as, for example, latex. To reduce the likelihood of an allergic reaction in a patient, an aligner may be formed with biological compatible layer that provides a barrier between a potentially harmful material, such as an allergen, and the patient's tissue.

Some compliant and stiff structures may be susceptible to wear and damage caused by fluids in the mouth. For example, saliva may weaken an aligner structure, increasing the rate at which it wears and reducing its stiffness. Therefore, in some embodiments, a saliva resistant layer may be formed on one or more surfaces of an aligner structure to resist wear caused by saliva. In some embodiments, the aligner may include a hydrophobic or hydrophilic layer or coating.

In some embodiments, multiple protective layers may be used. For example, a stain resistant protective layer may be formed over a wear resistant protective layer.

Figure 6C:
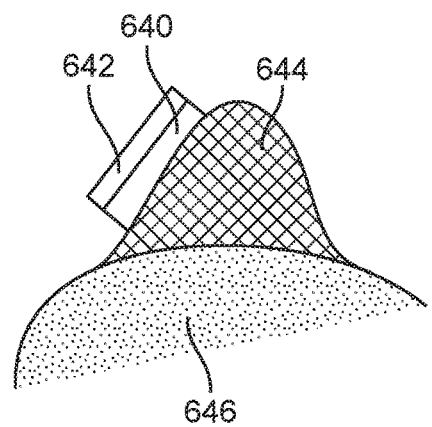
FIG. 6C illustrates a compliant attachment-mounted structure with a protective layer, in accordance with embodiments.

FIG. 6C illustrates a compliant attachment-mounted structure 640 with a protective layer 642, in accordance with embodiments. In the depicted embodiment, the compliant structure 640 is a pad structure coupled to a surface of an attachment 644 mounted on a tooth 646. The attachment 644 can be relatively stiff and/or hard compared to the compliant structure 640. The compliant structure 640 can be positioned so as to engage a stiff outer shell (not shown) that receives the tooth 646 and attachment 644. The protective layer 642 can be formed on a surface of the compliant structure 640 that would contact the stiff outer shell, thus protecting the compliant structure 640 from wear due to abrasion by the stiff outer shell.

An orthodontic appliance incorporating a compliant inner structure coupled to a stiff outer shell can allow for relatively independent application of forces and/or torques on different teeth. In some embodiments, this can be achieved by increasing the stiffness of the outer shell so as to reduce the extent to which deformation and/or deflection of one shell portion causes deformation and/or deflection of other shell portions. In such embodiments, the outer shell may be significantly stiffer than shells used in other types of orthodontic appliances. For example, an appliance configured for independent force and/or torque application can include an outer shell with an elastic modulus of about 2.5 GPa, or within a range from about 1 GPa to about 25 GPa. In some embodiments, increased stiffness can be achieved by increasing the thickness of the outer shell. A plurality of compliant inner structures can be coupled to the stiff outer shell so as to transmit forces and/or torques to individual teeth or subsets of teeth, in accordance with the methods provided herein. Such appliances can allow force and/or torque application to be customized on a per-tooth basis and improve predictability of effects on neighboring teeth.

Figure 7A:
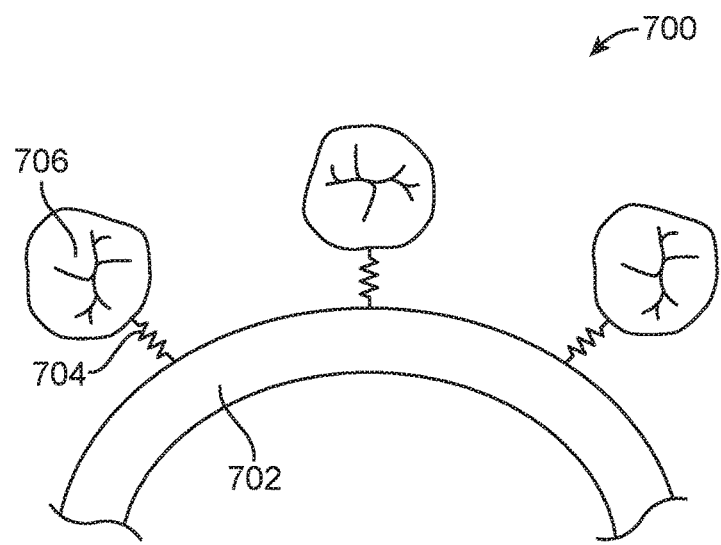
FIGS. 7A, 7B, and 7C schematically illustrate independent force application on teeth, in accordance with embodiments.
Figure 7B:
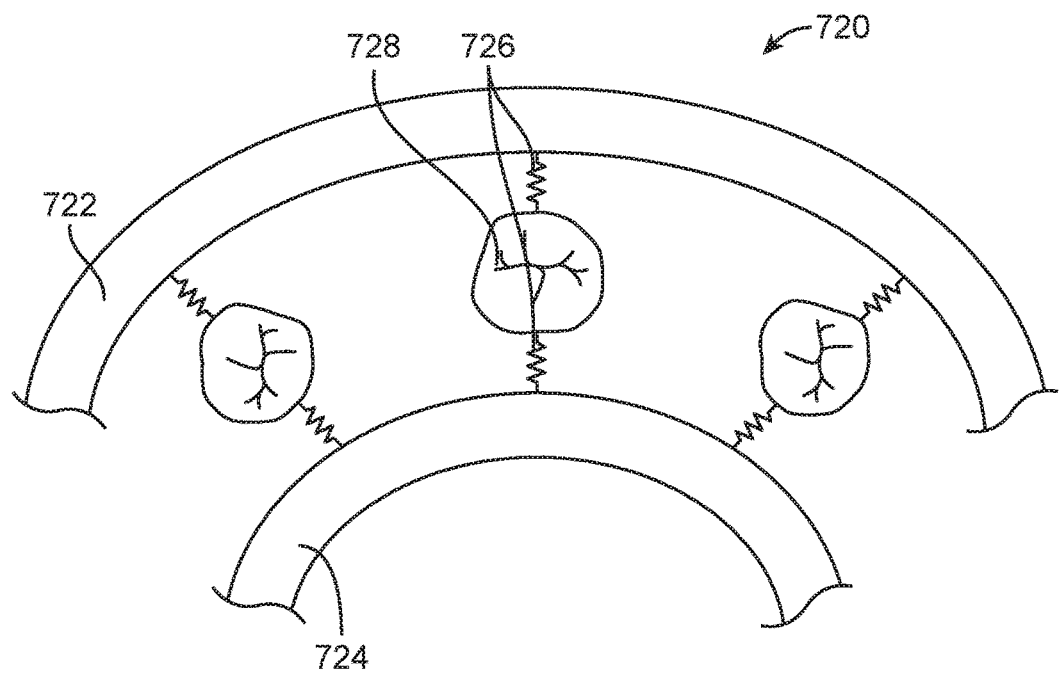
Figure 7C:
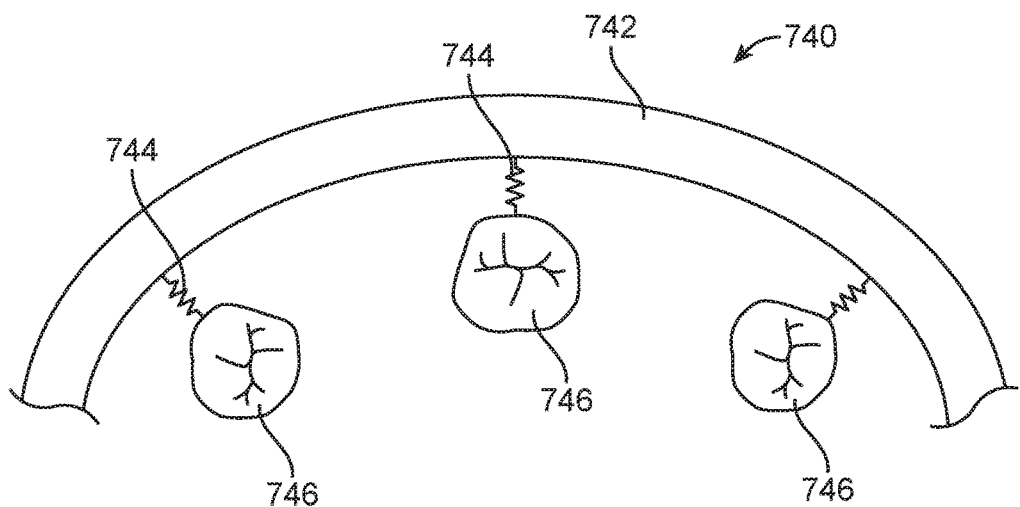

FIGS. 7A, 7B, and 7C schematically illustrate independent force application on teeth, in accordance with embodiments. FIG. 7A illustrates an appliance 700 in which the outer shell includes a stiff lingual portion 702. In alternative embodiments, the appliance 700 can include a stiff buccal portion rather than a stiff lingual portion. A plurality of compliant inner structures (depicted schematically as springs 704) are coupled to an inner surface of the lingual portion 702, with each inner structure positioned to engage a single tooth 706. The lingual portion 702 can be sufficiently stiff such that forces and/or torques can be independently applied to each tooth 706 via the respective inner structure. FIG. 7B illustrates an appliance 720 similar to the appliance 700, except that the outer shell includes a stiff buccal portion 722 in addition to a stiff lingual portion 724. Compliant inner structures (depicted schematically as springs 726) can be coupled to the buccal portion 722 and/or the lingual portion 724 in order to engage individual teeth 728 and transmit forces and/or torques. FIG. 7C illustrates an appliance 740 similar to the application 700, except that the outer shell is a stiff buccal portion 742, rather than a stiff lingual portion. Compliant inner structures (depicted schematically as springs 744) are coupled to an inner surface of the buccal portion 742, with each inner structure positioned to engage a single tooth 746. The buccal portion 742 can be sufficiently stiff that forces and/or torques can be independently applied to each tooth 746 via the respective structure.

In alternative embodiments, an orthodontic appliance configured for independent force and/or torque application can include a plurality of discrete stiff shell segments each receiving a subset of teeth, rather than the continuous stiff shell portions depicted in FIGS. 7A, 7B, and 7C. The shell segments can be coupled to each other via flexures or other connecting elements that permit relative movement of the segments. The use of discrete shell segments can further insulate subsets of teeth from being affected by forces and/or torques applied to other subsets.

In some embodiments, the surface properties of the compliant inner structure can be modulated to further improve contact between the appliance and received teeth. In some embodiments, the inner structure is formed from a tacky or high friction material to aid in creating tangential forces and/or torques on the tooth surface. Alternatively or in combination, the inner structure can have a textured surface shaped to control movement of saliva relative to the tooth surface, e.g., by channeling it away from or towards the tooth surface. For instance, channeling saliva away from the area of engagement can allow for higher friction contact between the appliance and tooth surface. Surface textures for removing saliva can include pointed structures, voids or other sponge-like structures, flexible channels that deform to push saliva out, or combinations thereof. In other embodiments, channeling saliva towards the engagement area can increase surface tension between the appliance and the teeth, which can improve force and/or torque delivery to the teeth. Surface textures for channeling saliva towards the engagement area can include channels shaped to draw in and retain saliva by capillary action. Optionally, alterations in surface properties can be achieved by applying a coating with the desired properties to the inner structure, rather than varying the properties of the inner structure itself.

The orthodontic appliances provided herein can include other components in addition to a stiff outer shell and compliant inner structure. In some embodiments, an appliance can further include one or more additional layers coupled to the outer surface of the outer shell, and these layers can perform various different functions. For example, the appliance can include an outermost layer coupled to the outer surface of the outer shell. The outermost layer can be less stiff than the outer shell in order to provide cushioning for teeth of the opposing jaw, improve patient comfort, and/or aid in settling the appliance on the teeth. Alternatively or in combination, the outermost layer can have a greater stiffness and/or hardness than the outer shell, e.g., in order to protect the appliance, against abrasion, wear, staining, biological interactions (e.g., reduce plaque or biological growth), and the like. For example, the outermost layer can have a hardness greater than or equal to about 70 Shore D or about 90 Shore D. In some embodiments, the properties of the outermost layer are selected to improve the aesthetics of the appliance. Appliances with localized variations in geometry (e.g., non-uniform thicknesses, protrusion, recesses, etc.) may have a less aesthetic appearance due to non-uniform optical properties, such as reflectivity. Accordingly, the outermost layer can be designed to provide a relatively smooth outer surface in order to improve the external appearance of the appliance. The outermost layer can be thinner than the outer shell and/or inner structure in order to reduce the contributions of the outermost layer to the overall properties of the appliance.

Similarly, in some embodiments, an appliance can further include one or more additional layers coupled to the inner surface of the outer shell and/or inner structure, and these layers can perform various different functions. For example, the appliance can include an innermost layer coupled to an inner surface of the inner structure, and the innermost layer can be stiffer and/or harder than the inner structure, e.g., to protect the inner structure from abrasion, wear, staining, biological interactions, and the like. The innermost layer can have a hardness greater than or equal to about 70 Shore D or about 90 Shore D, for instance. Alternatively, the innermost layer can be less stiff than the inner structure in order to provide cushioning for teeth of the opposing jaw, improve comfort, etc. The innermost layer can be thinner than the outer shell and/or inner structure in order to reduce the contributions of the innermost layer to the overall properties of the appliance.

The present disclosure provides various methods for fabricating the orthodontic appliances with different localized properties described herein. As discussed herein, such appliances can be produced by using multiple materials (e.g., a relatively stiff material and a relatively compliant material), with the different portions having different material compositions and/or geometries. In some embodiments, the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by additive manufacturing, milling, etc.) and thermoforming one or more sheets of material over the mold in order to generate an appliance shell. In some embodiments, an appliance is fabricated by producing a material sheet with different portions having different localized properties, then forming (e.g., thermoforming) the material sheet over a mold (e.g., a positive mold of a tooth arrangement) to produce a shell. Optionally, additional material addition and/or removal steps can occur after the shell has been formed in order to generate the final appliance.

In order to ensure that forces and/or torques are accurately generated and applied to the appropriate teeth, it is important that the different appliance portions are correctly positioned relative to the underlying teeth. The positioning of the appliance portions in the final appliance can depend on how the different portions are positioned on the material sheet used to form the appliance. Accordingly, it can be beneficial to determine spatial correspondences between locations on the material sheet, portions of the appliance, and portions of the patient's teeth in order to ensure accurate appliance fabrication.

Figure 8A:
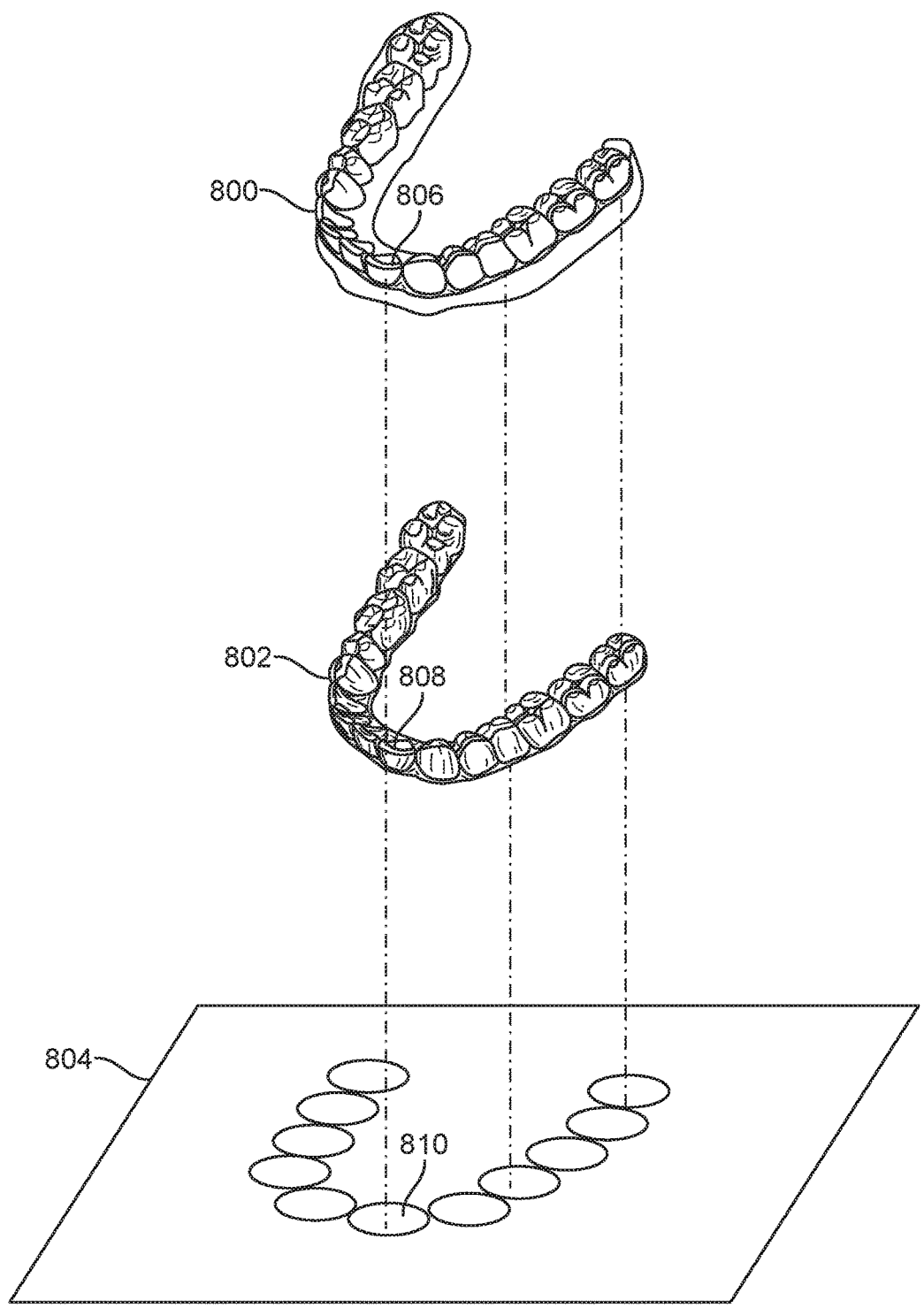
FIG. 8A illustrates spatial correspondences between a patient's teeth, an orthodontic appliance, and a material sheet, in accordance with embodiments.

FIG. 8A illustrates spatial correspondences between a patient's teeth 800, an orthodontic appliance 802, and a material sheet 804, in accordance with embodiments. As described herein, the appliance 802 can include a shell with a plurality of teeth-receiving cavities each shaped to receive a respective tooth of the patient's jaw. The appliance 802 can be formed from a material sheet 804, e.g., by thermoforming over a mold. Accordingly, each tooth can be spatially mapped to a corresponding shell portion of the appliance 802, and each shell portion can be spatially mapped to a corresponding sheet portion of the material sheet 804. For example, in the depicted embodiment, tooth 806 is received within a shell portion 808, which is formed from sheet portion 810. The spatial mappings can then be used as a basis for fabricating the material sheet 804.

Figure 8B:
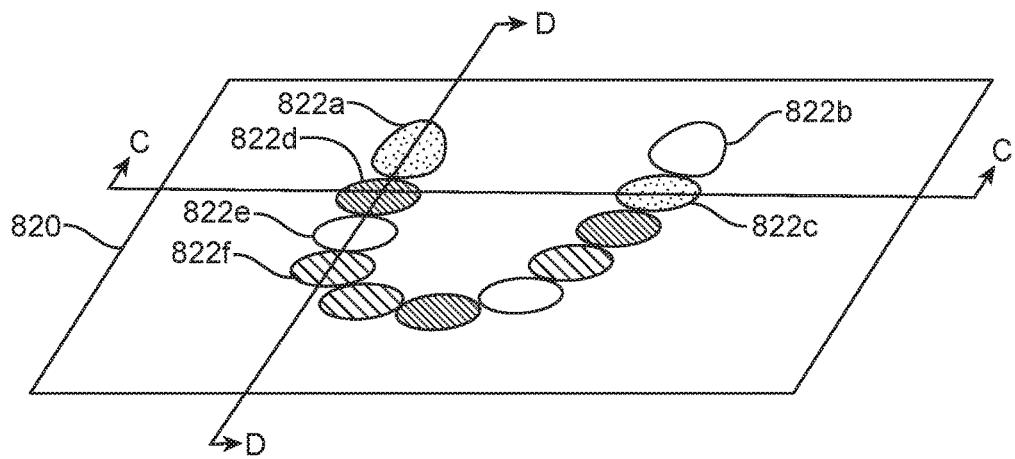
FIG. 8B illustrates a material sheet for forming an appliance, in accordance with embodiments.

FIG. 8B illustrates a material sheet 820 for forming an appliance, in accordance with embodiments. The material sheet 820 can include a plurality of different sheet portions 822, each corresponding to a respective shell portion of an appliance to be formed from the sheet 820. Different sheet portions 822 of the material sheet 820 can have different properties (e.g., thickness, stiffness, elastic modulus, etc.), as indicated by the different shading in FIG. 8B, such that the formed appliance has shell portions with different properties. For example, different sheet portions can have different material compositions, such that the material type(s) used to form each sheet portion can vary. Alternatively or in combination, different sheet portions 822 can utilize the same material(s) but can vary the geometry (e.g., thickness) of the material(s) so as to achieve different properties. In some embodiments, a sheet portion 822 may be mapped to one or more teeth, for example, sheet portion 822a is elongated and is mapped to two teeth and sheet portion 822b is elongated and is mapped to three teeth.

Figure 8C:
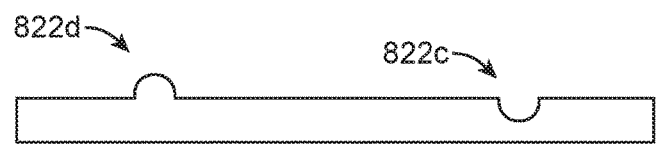
FIG. 8C illustrates a cross section of the material sheet of FIG. 8B, in accordance with embodiments.
Figure 8D:
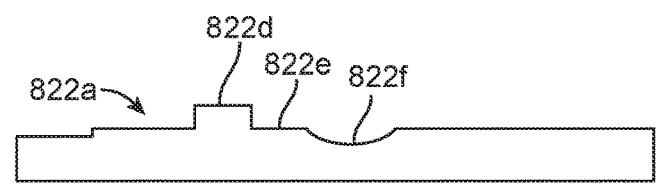
FIG. 8D illustrates a cross section of the material sheet of FIG. 8B, in accordance with embodiments.

In some embodiments, the different properties are uniform across a sheet portion 822. In some embodiments, the different properties may be variable within a sheet portion 822 or across the material sheet 820. For example, FIG. 8C and FIG. 8D show examples of variable properties across the sheet 820 and the individual sheet portions 822. FIG. 8C shows a cross section though the sheet 820 and sheet portions 822d and 822c. The sheet portion 822d shows an example of a sheet portion having a step change at its edges and a variable convex shape across the portion 822d, from one side to the other. The sheet portion 822c shows an example of a sheet portion having a concave shape, wherein the thickness varies from one side to the other, but without a step change at its edges. The thickness profile and cross-sectional shape of the sheet portions 822 and the material sheet 820 may vary according to the desired properties of the resulting appliance.

FIG. 8D shows another cross section through the sheet 820 and four sheet portions 822a, 822d, 822e, 822f of FIG. 8B. Sheet portion 822a is an example of a sheet portion 822 with a step change at its edges, but with a continuous thickness, while sheet portion 822d is an example of a sheet portion with a step change at its edges, but a variable thickness along its length, having a first thickness at one edge and a second thickness at its other edge. Sheet portion 822e is an example of a constant thickness sheet portion, while sheet portion 822f is an example of a concave, variable thickness sheet portion with continuous thickness change at its edges.

Figure 9:
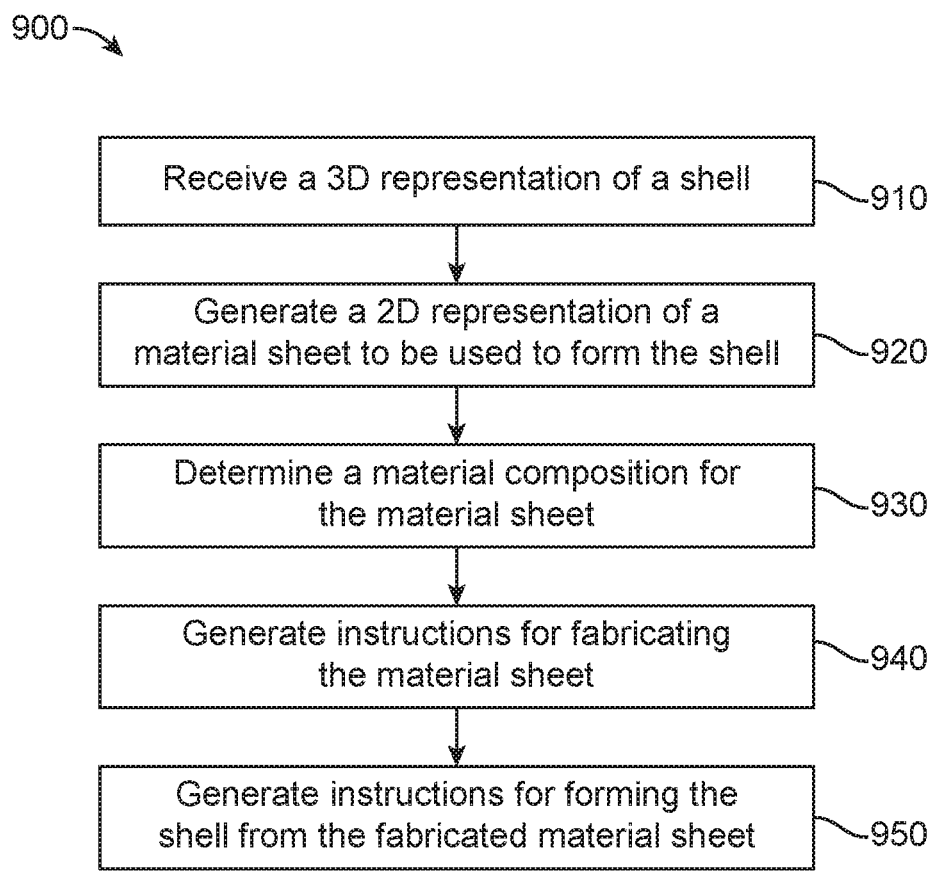
FIG. 9 illustrates a method for designing and fabricating an orthodontic appliance, in accordance with embodiments.

FIG. 9 illustrates a method 900 for designing and fabricating an orthodontic appliance, in accordance with embodiments. In some embodiments, the method 900 is a computer-based method, such that some or all of the steps of the method 900 are performed by one or more processors of a computing device or system.

In step 910, a 3D representation of a shell is received. The 3D representation can be a 3D digital model, for example. The shell can include a plurality of cavities shaped to receive the patient's teeth as described herein. In some embodiments, the shell includes a plurality of shell portions each positioned to receive and engage a different subset of the patient's teeth (e.g., a single tooth, multiple teeth, a portion of a tooth). The 3D representation can depict the 3D geometry of an appliance shell for a treatment stage of an orthodontic treatment plan. The 3D geometry can be generated based on a digital representation of the patient's teeth in a desired tooth arrangement, as described herein.

In step 920, a 2D representation of a material sheet to be used to form the shell is generated. The 2D representation can correspond to the 3D representation of the shell, such that the 3D representation is used as a basis for generating the 2D representation. In some embodiments, the 3D representation is transformed, e.g., by "flattening" or "expanding," in order to produce the 2D representation. The transformation procedure can be based on the expected behavior of the material sheet during the forming process. For example, the transformation method can account for factors such as the geometries of the teeth-receiving cavities, the fabrication method to be used to form the shell, the fabrication temperature to be used, the material(s) to be used, material properties of the material(s) to be used (e.g., strain rate), or combinations thereof. Alternatively or in combination, step 920 can involve determining correspondences between individual points on the 2D representation of the material sheet to points on the 3D representation of the shell by simulating or emulating the direct or inverse deformation from the 2D sheet geometry to the 3D shell geometry.

The material sheet can include a plurality of sheet portions each corresponding to a respective shell portion, and the 2D representation can include information indicating these spatial correspondences. The spatial correspondences can be determined, for example, by tracking various points on the 3D representation during the transformation procedure to determine their final locations in the 2D representation. Thus, each sheet portion in the 2D representation can be mapped to a corresponding shell portion in the 3D representation. The 2D representation of the sheet can then be updated, processed, and/or modified at selected locations to selectively and locally modify the properties of the 3D shell to be formed, as discussed further herein.

In step 930, a material composition is determined for the material sheet. The material sheet can be formed from a plurality of overlapping material layers, a plurality of non-overlapping material sections, or combinations thereof, as described further herein. In some embodiments, a material composition is determined for each of the plurality of sheet portions, with at least some of the sheet portions having different material compositions (e.g., different number of material layers, different combinations of material types, different thicknesses of a material layer, etc.). For instance, some sheet portions can be fabricated using a compliant material coupled to a stiff material, while other portions can be fabricated using a stiff material only, such that the resultant appliance is a stiff outer shell with coupled compliant inner structures at certain locations. Optionally, at least some of the sheet portions can have different geometries (e.g., shapes, thicknesses, etc.).

As described herein, different shell portions of an appliance can be designed to have different properties in order to apply forces and/or torques to specific subsets of teeth. In order to achieve this, the sheet portions corresponding to the shell portions can be fabricated with different properties. The material composition for each sheet portion can be determined based on the desired properties for that particular portion. For example, a desired stiffness can be determined for each sheet portion, and the material composition of each sheet portion can be determined based on the desired stiffness.

In step 940, instructions are generated for fabricating the material sheet. The instructions can be transmitted to a fabrication system, such as a 3D printer or computer numerical control (CNC) milling machine. The instructions can cause the fabrication system to fabricate the material sheet having the sheet portions with the material compositions determined in step 930. The fabrication procedure can involve additive manufacturing processes, subtractive manufacturing processes, or combinations thereof. For example, the material sheet can be fabricated by milling, etching, coating, jetting, printing, bonding, spraying, extrusion, deposition, or combinations thereof. In some embodiments, the material sheet is fabricated using direct fabrication techniques, as discussed further herein.

In step 950, instructions are generated for forming the shell from the fabricated material sheet. The instructions can be transmitted to a forming system, such as a thermoforming system. In such embodiments, the shell can be formed by thermoforming the fabricated material sheet over a mold, such that the plurality of sheet portions of the material sheet are formed into the plurality of shell portions of the shell. In some embodiments, the step 950 involves accurately aligning the fabricated material sheet to the mold in order to ensure that the shell is formed with the desired material compositions at the intended locations.

The method 900 can be used to produce any embodiment of the appliances described herein, such as an appliance having a stiff outer shell and a compliant inner structure. For example, the method 900 can be used to fabricate a material sheet having a stiff outer layer and a compliant inner layer. The material sheet can have sheet portions with different material compositions, such as different thicknesses of the compliant inner layer. The material sheet can be formed into a shell, such that the compliant inner layer is positioned between the stiff outer layer and the patient's teeth when the shell is worn by the patient. The stiff outer layer can be configured to generate a force and/or torque when the shell is worn, and the compliant inner layer can be configured to distribute the force and/or torque to one or more teeth received within the shell.

Although the above steps show method 900 of designing and fabricating in accordance with embodiments, a person of ordinary skill in the art will recognize many variations based on the teaching described herein. Some of the steps may comprise sub-steps. Some of the steps may be optional, such as one or more of steps 930, 940, or 950. The order of the steps may be varied as desired. For instance, in alternative embodiments, step 950 could be performed after step 920 and before step 930.

Figures 10A, 10B:
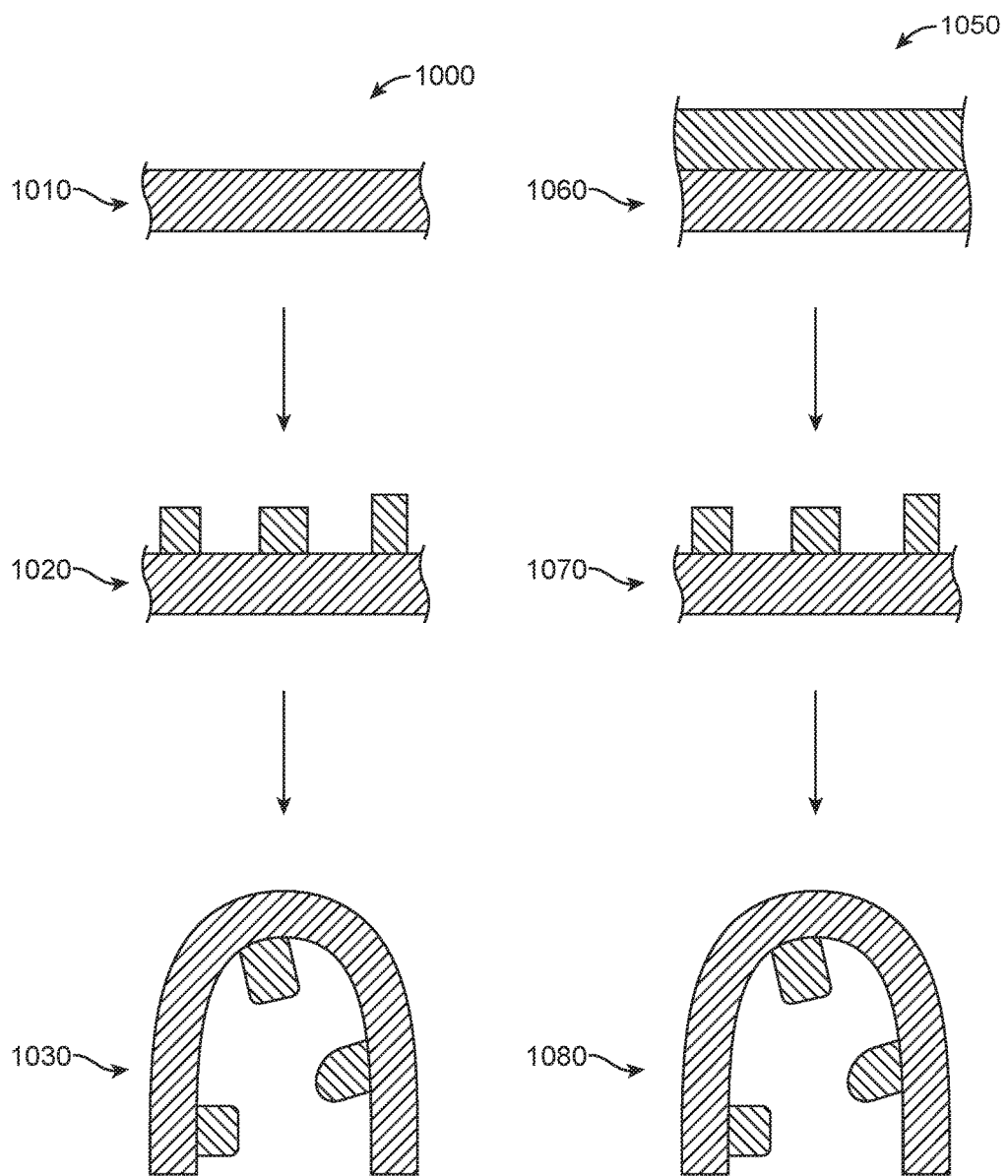
FIG. 10A illustrates an additive manufacturing process for fabricating an appliance, in accordance with embodiments.
FIG. 10B illustrates a subtractive manufacturing process for fabricating an appliance, in accordance with embodiments.

FIG. 10A illustrates an additive manufacturing process 1000 for fabricating an appliance, in accordance with embodiments. The process 1000 can be used in combination with any of the appliance fabrication methods described herein (e.g., the method 900). In step 1010, a material sheet including a layer of a first material is provided. The first material can be a relatively stiff material, for instance. In step 1020, a second, different material is added to one or more portions of the first layer. The second material can be a relatively compliant material, for instance. The second material can be applied, for example, by selective coating, jetting, printing, stereolithography techniques, bonding, extruding, or combinations thereof in order to produce a desired shape profile (e.g., a single continuous layer, a plurality of discrete structures, variable thicknesses, etc.). Optionally, the step 1020 can be repeated as desired to add any number of materials to the sheet. Alternatively, rather than using different materials, the process 1000 can involve joining multiple layers of the same material. The number and/or thickness of the material layers can be varied in order to produce the desired properties. In some embodiments, the steps 1010 and 1020 are performed using one or more of the direct fabrication techniques described herein. In step 1030, the material sheet is formed into a shell shaped to be worn over the teeth. For example, a sheet formed from a stiff first material and compliant second material can be molded such that first material forms an outer shell and the second material is located in the interior of the shell.

FIG. 10B illustrates a subtractive manufacturing process 1050 for fabricating an appliance, in accordance with embodiments. The process 1050 can be used in combination with any of the appliance fabrication methods described herein (e.g., the method 900). In step 1060, a material sheet is provided including a first layer of a first material and a second layer of a second material. The first material can be a relatively stiff material and the second material can be a relatively compliant material for instance. In step 1070, one or more portions of the second layer are removed. The second layer portions can be removed, for example, by milling, chemical etching, laser etching, or combinations thereof in order to produce a desired shape profile (e.g., a single continuous layer, a plurality of discrete structures, variable thicknesses, etc.). Optionally, the step 1070 can also involve removing one or more portions of the first layer. In step 1080, the material sheet is formed into a shell shaped to be worn over the teeth. For example, the first layer can form an appliance shell and the second layer can be located in the interior of the shell.

Figure 11A:
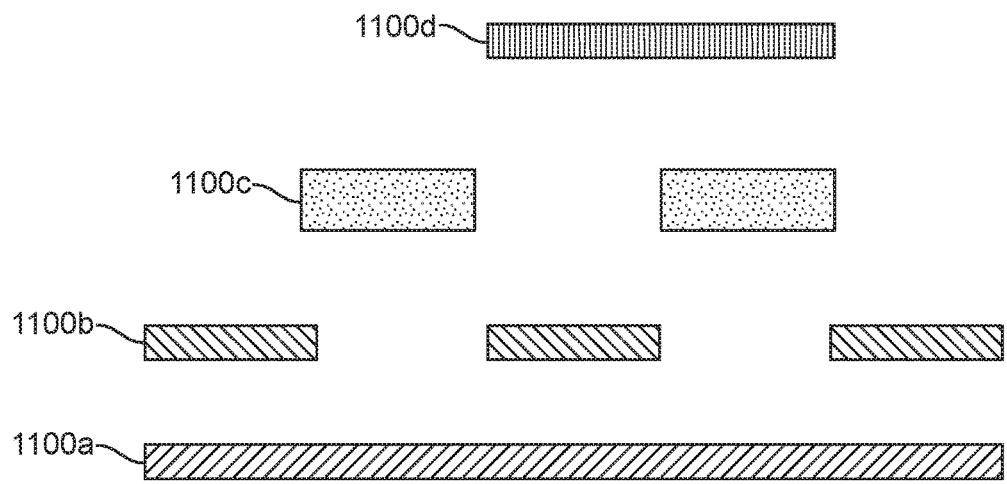
FIGS. 11A and 11B illustrate fabrication of a material sheet from a plurality of overlapping material layers, in accordance with embodiments.
Figure 11B:
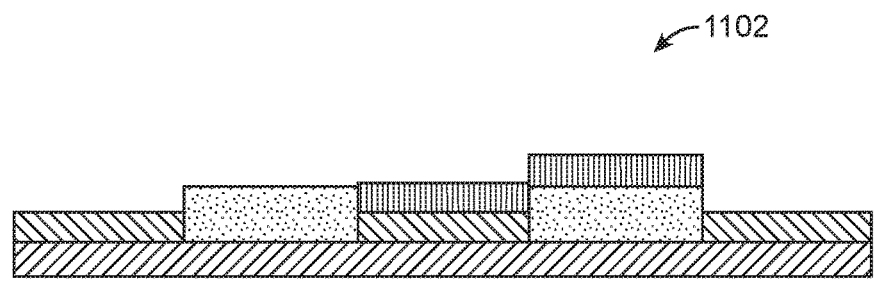

FIGS. 11A and 11B illustrate fabrication of a material sheet from a plurality of overlapping material layers 1100a-d, in accordance with embodiments. A plurality of overlapping material layers 1100a-d can be provided, as depicted in FIG. 11A (illustrating a cross-sectional view). Some or all of the material layers 1100a-d can be made from different material types and/or have different properties, as indicated by the different shading in the depicted embodiment. Alternatively, some or all of the material layers 1100a-d can be made from the same material type and/or have the same properties. In some embodiments, the coverage area of some or all of the layers differ from each other. For example, in the depicted embodiment, layer 1100a spans the entire material sheet, while layers 1100b-d only partially span the material sheet. Layers with partial coverage can be fabricated in a variety of ways, e.g., by selective removal of one or more layer portions from a larger layer, fabricating the layer to include only the desired portions, etc.

The material layers 1100a-d can be coupled together to form a multilayered material sheet 1102, as shown in FIG. 11B. The different layers 1100a-d can be sequentially coupled to each other, or can all be coupled together simultaneously. In some embodiments, the material sheet 1102 is formed using the direct fabrication techniques described herein. The fabricated material sheet 1102 can include multiple layers of different materials, with different material compositions at different locations according to the coverage of each individual material layer. Different portions of the material sheet 1102 can have different thicknesses, based on the number and/or the thicknesses of the layers used to form each portion. In some embodiments, a material sheet may have two, three, four, or more layers of similar or different materials.

Figure 12A:
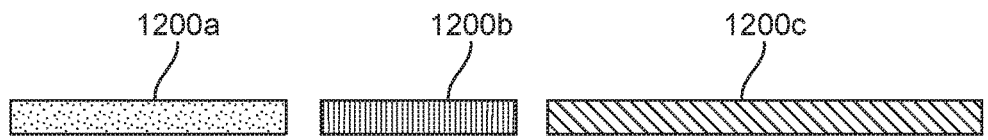
FIGS. 12A through 12C illustrate fabrication of a material sheet from a plurality of non-overlapping material sections, in accordance with embodiments.
Figure 12B:
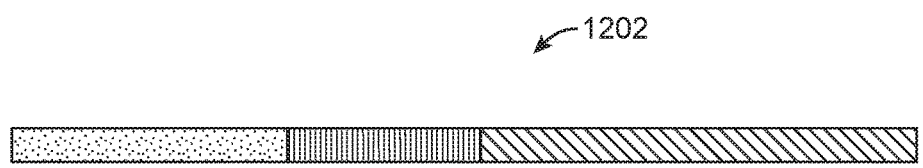
Figure 12C:
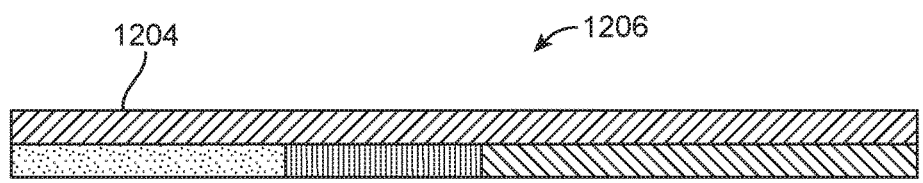

FIGS. 12A through 12C illustrate fabrication of a material sheet from a plurality of non-overlapping material sections 1200a-c, in accordance with embodiments. A plurality of non-overlapping material sections 1200a-c can be provided, as depicted in FIG. 12A (illustrating a cross-sectional view). Some or all of the material sections 1200a-c can be made from different material types and/or have different properties, as indicated by the different shading in the depicted embodiment. In some embodiments, the coverage area of some or all of the sections differ from each other. For example, in the depicted embodiment, each of the sections 1200a-c spans a different portion of the material sheet.

The material sections 1200a-c can be coupled together to form a single-layered material sheet 1202, as shown in FIG. 12B. The different sections 1200a-c can be sequentially coupled to each other, can all be coupled together simultaneously. In alternative embodiments, the material sheet 1202 can be fabricated without first providing discrete material sections 1200a-c, e.g., by using a printing process or selective coating to apply different materials at different locations. In some embodiments, the material sheet 1202 is formed using the direction fabrication techniques described herein. The fabricated material sheet 1202 can include different material compositions at different sheet portions, according to the location of each material section.

Optionally, one or more support layers 1204 can be coupled to the single-layered material sheet 1202, resulting in a multi-layered material sheet 1206. The support layer 1204 can be used to reinforce the single-layered material sheet 1202, particularly at or near the areas where the different material sections 1200a-c are joined together. In some embodiments, a single support layer 1204 is used. Alternatively, multiple support layers can be used, e.g., coupled to the upper and lower surfaces of the single-layered material sheet 1202 so as to enclose the sheet 1202. The support layer can be relatively thin compared to the single-layered material sheet 1202 so as to provide little or no effect on the stiffness of the final sheet 1206. This approach can be used to provide a stronger sheet and reduce the likelihood of breakage or separation between the different material sections 1200a-c.

The various embodiments of the orthodontic appliances presented herein can be fabricated in a wide variety of ways. In some embodiments, the orthodontic appliances herein (or portions thereof) are produced using direct fabrication, such as additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

In some embodiments, the orthodontic appliances herein are formed using both direct fabrication and indirect fabrication techniques. For instance, a direct fabrication technique (e.g., vat photopolymerization, material jetting, binder jetting, material extrusion, powder bed fusion, sheet lamination, or directed energy deposition) can be used to form a first portion of the appliance, and an indirect fabrication technique (e.g., thermoforming) can be used to form a second portion of the appliance. In some embodiments, a direct fabrication technique is used to produce a material sheet with variable material properties and/or compositions as described herein, and an indirect fabrication technique is used to form the material sheet into the appliance.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials (e.g., resins, liquids, solids, or combinations thereof) from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed. The relative arrangement of the first and second portions can be varied as desired, e.g., the first portion can be partially or wholly encapsulated by the second portion of the object.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 μm, or within a range from about 5 μm to about 50 μm, or within a range from about 20 μm to about 50 μm.

Direct fabrication can provide improved control over the geometry and material properties of the appliance in three dimensions. In some embodiments, the direct fabrication techniques described herein can be used to produce appliances with substantially isotropic material properties, e.g., substantially the same or similar strengths along all directions. In some embodiments, the direct fabrication techniques described herein can be used to produce appliances with anisotropic material properties. For example, the layers of material that form an appliance may include layers of material having different directionality. For example, a first layer may include a polymer material having polymer chains arranged in substantially a first direction while a second layer may include a polymer material having polymer chains arranged in substantially a second direction, the first direction being different than the second direction. In some embodiments, the direct fabrication approaches herein permit production of an orthodontic appliance with a strength that varies by no more than about 25%, about 20%, about 15%, about 10%, about 5%, about 1%, or about 0.5% along all directions. Alternatively, direct fabrication can be used to fabricate appliances with anisotropic and/or heterogeneous material properties, such as appliances with both stiff portions (e.g., a stiff outer shell) and compliant portions (e.g., a compliant inner structure), as discussed herein. For instance, the appliances with structures presented herein such as multiple layers (see, e.g., FIGS. 4A through 4C), a plurality of discrete pad structures (see, e.g., FIG. 5A, a plurality of discrete plug structures (see, e.g., FIG. 5B), a plurality of discrete inflatable structures (see, e.g., FIG. 5C), attachment-engaging structures (see, e.g., FIG. 6A), tooth-mounted attachments (see, e.g., FIG. 6B), attachment-mounted structures (see, e.g., FIG. 6C), and/or attachment templates (see, e.g., FIGS. 17A and 17B) can be easily produced using direct fabrication techniques.

In some embodiments, the appliances of the present disclosure are produced through the use of multi-material direct fabrication to deposit different types of materials at locations where different properties are desired. For instance, a relatively stiff or rigid material can be deposited at locations where increased stiffness is desired (e.g., a stiff outer shell), and a relatively compliant or elastic material can be deposited at locations where increased compliance is desired (e.g., a compliant inner structure). The production of an appliance from multiple materials can be performed concurrently in a single manufacturing step, or in a plurality of sequential steps, as discussed above and herein. In some embodiments, the compliant inner structure is formed concurrently and integrally with the stiff outer shell, rather than being coupled to the shell in a separate step after the shell has already been produced.

Alternatively or in combination, the appliances herein are produced through the use of direct fabrication techniques that vary the geometry of the appliance at locations where different properties are desired. For example, a direct fabrication process can selectively vary the thickness of the formed material in order to control the resultant stiffness of the appliance, e.g., such that stiffer portions of the appliance have an increased thickness compared to more compliant portions of the appliance. As another example, stiffness-modulating structures such as apertures, slits, perforations, etchings, and the like can be selectively formed at certain locations in the appliance in order to reduce the local stiffness at those locations. Direct fabrication permits formation of such structures integrally and concurrently with formation of the appliance, such that separate cutting or etching steps are not needed. In yet another example, direct fabrication process parameters such as curing parameters (e.g., curing time, energy, power, spacing, depth) can be selectively varied in order to influence the stiffness and/or other properties of the material. In many embodiments, control over the curing parameters is used to control the degree of crosslinking of the formed material, which in turn contributes to the local stiffness (e.g., increased crosslinking produces increased stiffness, reduced crosslinking produces reduced stiffness).

Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled additive manufacturing such as direct jetting, etc.). The computer-based methods presented herein can improve the accuracy, flexibility, and convenience of appliance fabrication.

Figure 15:
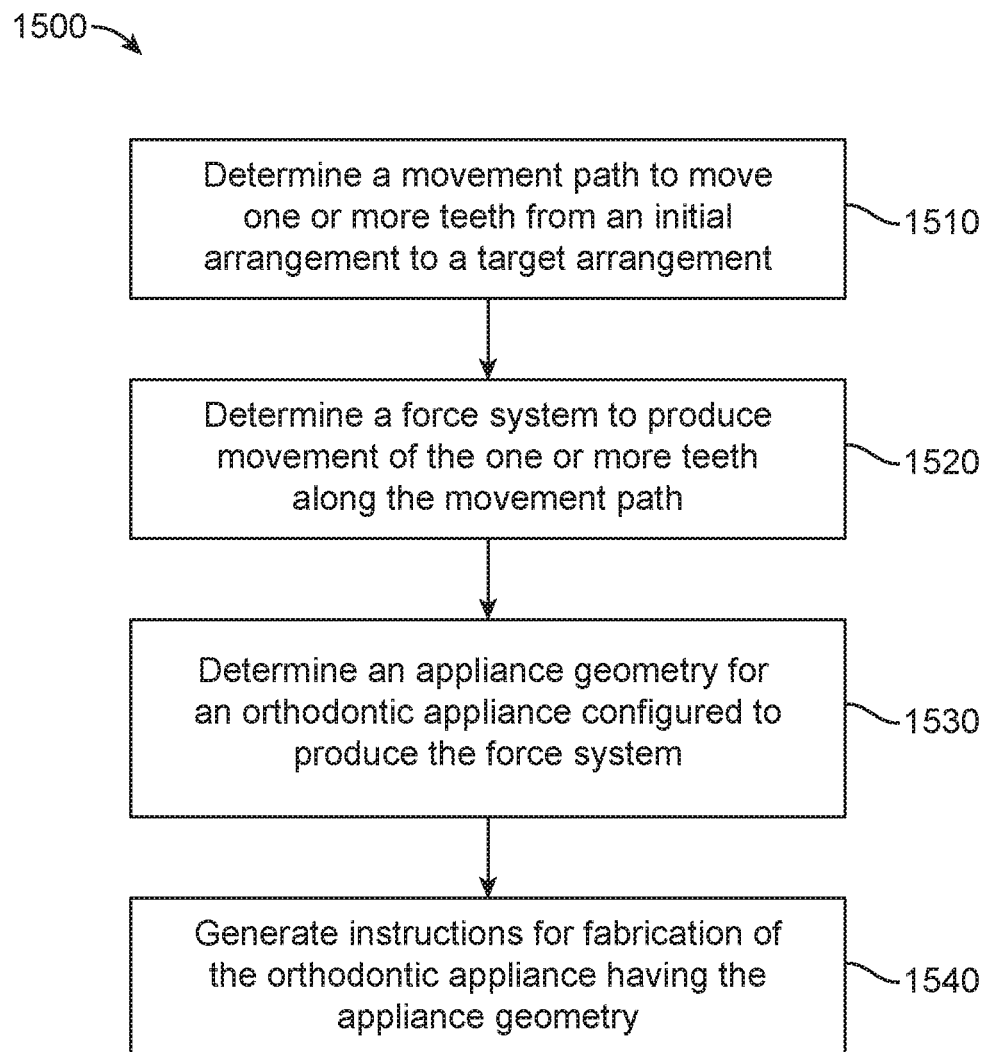
FIG. 15 illustrates a method for designing an orthodontic appliance, in accordance with embodiments.

FIG. 15 illustrates a method 1500 for designing an orthodontic appliance to be produced by direct fabrication, in accordance with embodiments. The method 1500 can be applied to any embodiment of the orthodontic appliances described herein. Some or all of the steps of the method 1500 can be performed by any suitable data processing system or device, e.g., one or more processors configured with suitable instructions.

In step 1510, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 1520, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

In step 1530, an appliance geometry for an orthodontic appliance configured to produce the force system is determined. The appliance can include a stiff outer shell and a compliant inner structure, as discussed herein. The step 1530 can involve determining the shape and arrangement of the outer shell and inner structure that would produce the forces and/or torques to be applied to the teeth, in accordance with the various embodiments presented herein. For instance, compliant inner structures such as discrete pads or plugs can be positioned to selectively engage the teeth at locations where the forces and/or torques are to be exerted. Determination of the appliance geometry can involve determining geometries for one or more force modifying structures formed in the inner structure and/or outer shell in order to apply forces and/or torques at specified contact points on teeth. Optionally, the step 1530 further involves determining a material composition for the outer shell and/or inner structure in order to apply the desired force system with reduced sensitivity to manufacturing variations, as discussed herein. In some embodiments, the material composition is selected based on the desired properties (e.g., stiffness) for the shell and/or inner structure.

Determination of the appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif. For creating finite element models and analyzing them, program products from a number of vendors can be used, including finite element analysis packages from ANSYS, Inc., of Canonsburg, Pa., and SIMULIA(Abaqus) software products from Dassault Systèmes of Waltham, Mass.

Optionally, one or more appliance geometries can be selected for testing or force modeling. As noted above, a desired tooth movement, as well as a force system required or desired for eliciting the desired tooth movement, can be identified. Using the simulation environment, a candidate appliance geometry can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 1540, instructions for fabrication of the orthodontic appliance having the appliance geometry are generated. The instructions can be configured to control a fabrication system or device in order to produce the orthodontic appliance with the specified appliance geometry. In some embodiments, the instructions are configured for manufacturing the orthodontic appliance using direct fabrication (e.g., stereolithography, selective laser sintering, fused deposition modeling, direct jetting, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 1500 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 1500 may be performed with any suitable fabrication system or device, such as the embodiments described herein. Some of the steps may be optional, and the order of the steps can be varied as desired.

Figure 13:
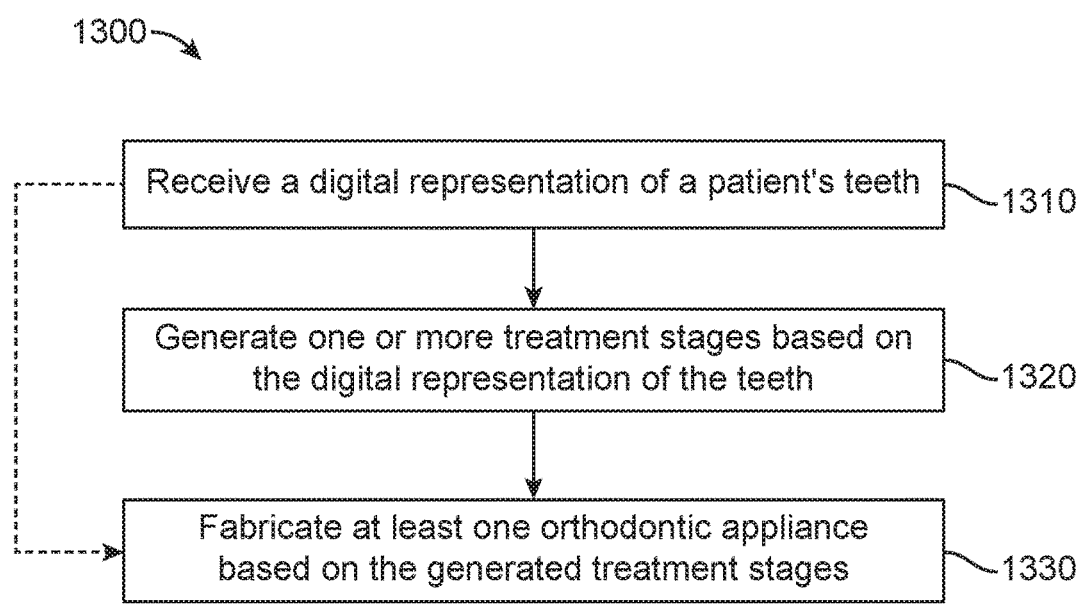
FIG. 13 illustrates a method for digitally planning an orthodontic treatment, in accordance with embodiments.

FIG. 13 illustrates a method 1300 for digitally planning an orthodontic treatment and/or design or fabrication of an appliance, in accordance with many embodiments. The method 1300 can be applied to any of the treatment procedures described herein and can be performed by any suitable data processing system. Any embodiment of the appliances described herein can be designed or fabricated using the method 1300.

In step 1310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 1320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 1330, at least one orthodontic appliance is fabricated based on the generated treatment stages. For example, a set of appliances can be fabricated to be sequentially worn by the patient to incrementally reposition the teeth from the initial arrangement to the target arrangement. Some of the appliances can be shaped to accommodate a tooth arrangement specified by one of the treatment stages. Alternatively or in combination, some of the appliances can be shaped to accommodate a tooth arrangement that is different from the target arrangement for the corresponding treatment stage. For example, as previously described herein, an appliance may have a geometry corresponding to an overcorrected tooth arrangement. Such an appliance may be used to ensure that a suitable amount of force is expressed on the teeth as they approach or attain their desired target positions for the treatment stage. As another example, an appliance can be designed in order to apply a specified force system on the teeth and may not have a geometry corresponding to any current or planned arrangement of the patient's teeth.

In some instances, staging of various arrangements or treatment stages may not be necessary for design and/or fabrication of an appliance. As illustrated by the dashed line in FIG. 13, design and/or fabrication of an orthodontic appliance, and perhaps a particular orthodontic treatment, may include use of a representation of the patient's teeth (e.g., receive a digital representation of the patient's teeth 1310), followed by design and/or fabrication of an orthodontic appliance based on a representation of the patient's teeth in the arrangement represented by the received representation.

Figure 14:
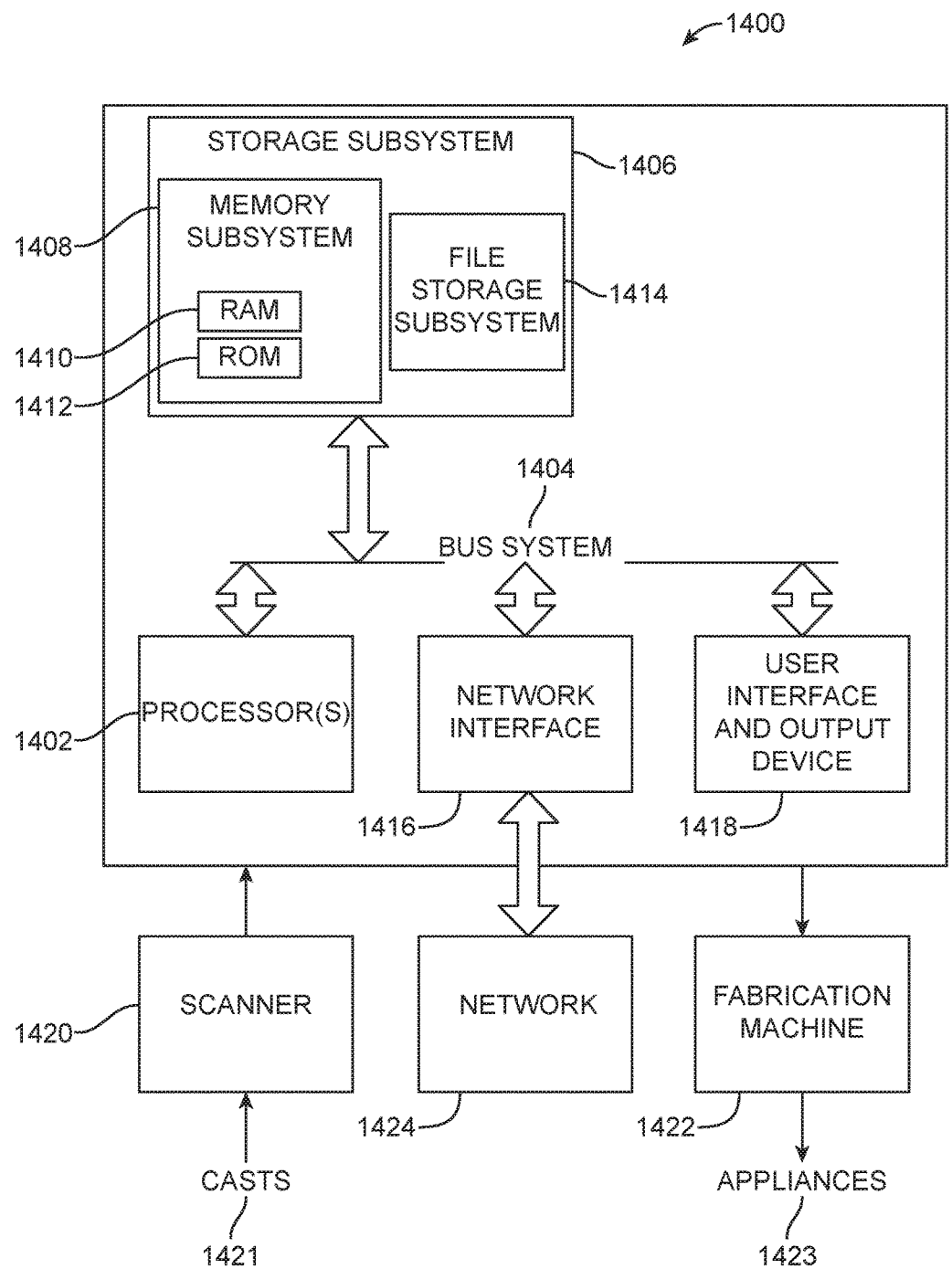
FIG. 14 is a simplified block diagram of a data processing system, in accordance with embodiments.

FIG. 14 is a simplified block diagram of a data processing system 1400 that may be used in executing methods and processes described herein. The data processing system 1400 typically includes at least one processor 1402 that communicates with one or more peripheral devices via bus subsystem 1404. These peripheral devices typically include a storage subsystem 1406 (memory subsystem 1408 and file storage subsystem 1414), a set of user interface input and output devices 1418, and an interface to outside networks 1416. This interface is shown schematically as "Network Interface" block 1416, and is coupled to corresponding interface devices in other data processing systems via communication network interface 1424. Data processing system 1400 can include, for example, one or more computers, such as a personal computer, workstation, mainframe, laptop, and the like.

The user interface input devices 1418 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 1406 maintains the basic required programming, including computer readable media having instructions (e.g., operating instructions, etc.), and data constructs. The program modules discussed herein are typically stored in storage subsystem 1406. Storage subsystem 1406 typically includes memory subsystem 1408 and file storage subsystem 1414. Memory subsystem 1408 typically includes a number of memories (e.g., RAM 1410, ROM 1412, etc.) including computer readable memory for storage of fixed instructions, instructions and data during program execution, basic input/output system, etc. File storage subsystem 1414 provides persistent (non-volatile) storage for program and data files, and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 1420 includes any means for obtaining a digital representation (e.g., images, surface topography data, etc.) of a patient's teeth (e.g., by scanning physical models of the teeth such as casts 1421, by scanning impressions taken of the teeth, or by directly scanning the intraoral cavity), which can be obtained either from the patient or from treating professional, such as an orthodontist, and includes means of providing the digital representation to data processing system 1400 for further processing. Scanner 1420 may be located at a location remote with respect to other components of the system and can communicate image data and/or information to data processing system 1400, for example, via a network interface 1424. Fabrication system 1422 fabricates appliances 1423 based on a treatment plan, including data set information received from data processing system 1400. Fabrication machine 1422 can, for example, be located at a remote location and receive data set information from data processing system 1400 via network interface 1424.

Figure 16:
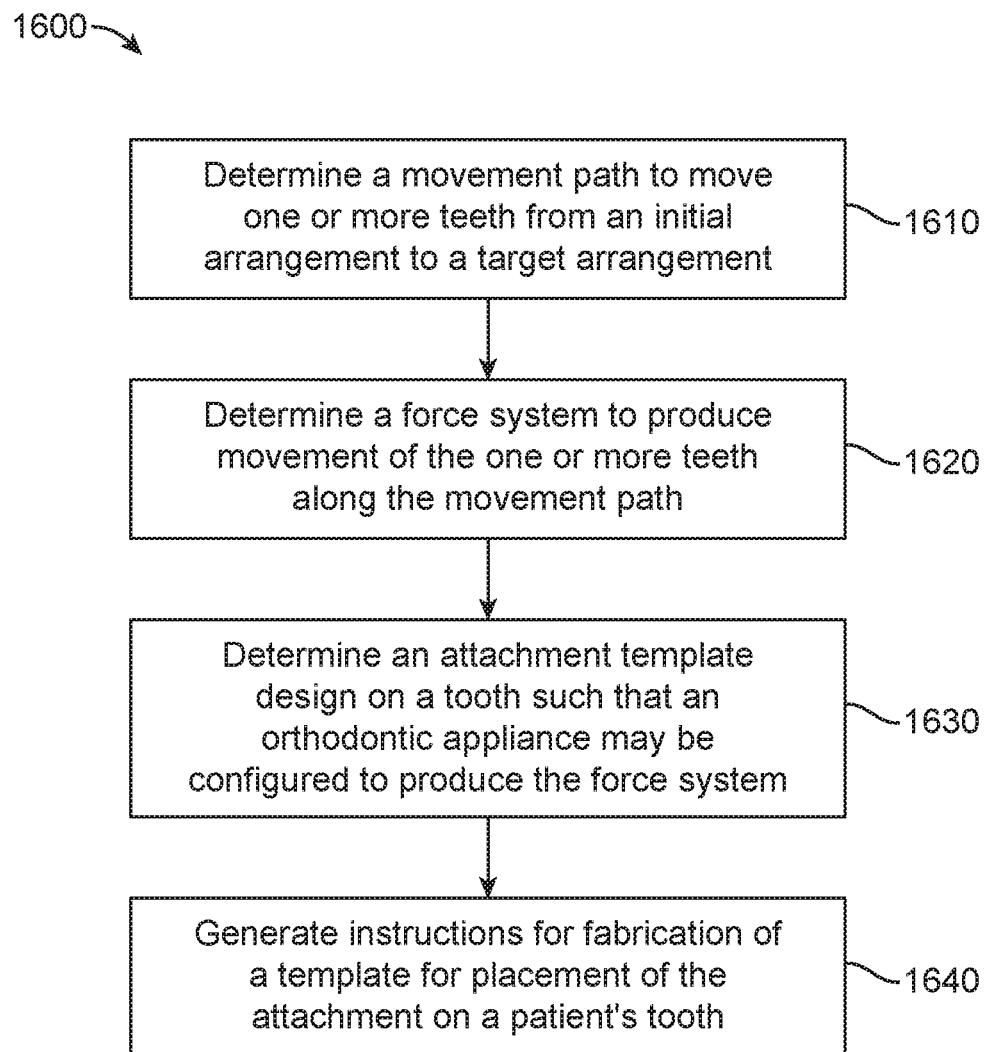
FIG. 16 illustrates a method for designing an orthodontic appliance, in accordance with embodiments.

FIG. 16 illustrates a method 1600 for designing an orthodontic appliance to be produced by direct fabrication, in accordance with embodiments. The method 1600 can be applied to any embodiment of the orthodontic appliances described herein. Some or all of the steps of the method 1600 can be performed by any suitable data processing system or device, e.g., one or more processors configured with suitable instructions.

In step 1610, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 1620, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

In step 1630, an attachment template design for an orthodontic appliance configured to produce the force system is determined. Determination of the attachment template design, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif. For creating finite element models and analyzing them, program products from a number of vendors can be used, including finite element analysis packages from ANSYS, Inc., of Canonsburg, Pa., and SIMULIA(Abaqus) software products from Dassault Systèmes of Waltham, Mass.

Optionally, one or more attachment template designs can be selected for testing or force modeling. As noted above, a desired tooth movement, as well as a force system required or desired for eliciting the desired tooth movement, can be identified. Using the simulation environment, a candidate attachment template design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 1640, instructions for fabrication of the orthodontic appliance incorporating the attachment template design are generated. The instructions can be configured to control a fabrication system or device in order to produce the orthodontic appliance with the specified attachment template design. In some embodiments, the instructions are configured for manufacturing the orthodontic appliance using direct fabrication (e.g., vat photopolymerization, material jetting, binder jetting, material extrusion, powder bed fusion, sheet lamination, or directed energy deposition, etc.), in accordance with the various methods presented herein. In alternative embodiments, the instructions can be configured for indirect fabrication of the appliance, e.g., by thermoforming.

Although the above steps show a method 1600 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 1600 may be performed with any suitable fabrication system or device, such as the embodiments described herein. Some of the steps may be optional, and the order of the steps can be varied as desired.

Figure 17A:
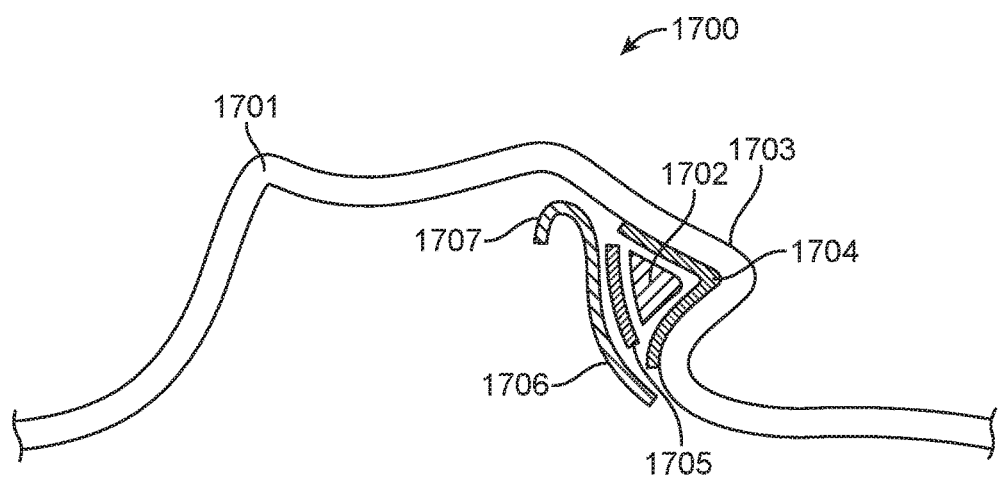
FIG. 17A illustrates a directly fabricated attachment template, in accordance with embodiments.

FIG. 17A illustrates a directly fabricated attachment template 1700 comprising an attachment, an alignment structure, and a support to hold the attachment. The template 1700 may comprise an aligner 1701. The aligner 1701 comprises a support 1703 to hold the attachment with sufficient force to support the attachment. The aligner 1701 is configured to receive a tooth and thereby align an attachment on the tooth. The attachment 1702 is designed to attach on a patient's tooth and have surfaces shaped to allow the application of tooth-moving forces when contacting a surface of an orthodontic appliance. The attachment 1702 is held with a support 1703. The support 1703 may define a receptacle with a shape corresponding to the attachment. The support 1703 is configured to hold the attachment so that the attachment contacts a tooth when the attachment template is worn by a patient. The attachment is connected to the aligner 1701 by a coupling structure 1704, which is configured to hold the attachment 1702 within the support 1703 until the attachment is affixed to the patient's tooth. After the attachment 1702 has been bonded to the patient's tooth, the coupling structure may be broken, as described in further detail below. Alternatively, the attachment can be weakly connected to the aligner, for example with structures such as perforations to facilitate removal of the attachment from the appliance.

In order to adhere to a patient's tooth, the attachment may comprise an adhesive layer 1705 directly deposited on its surface. In some embodiments, the attachment template may not include an adhesive layer 1705. In some embodiments, the surface of the patient's tooth may be prepared before the attachment is attached to the tooth, for example, the surface of the tooth may be acid etched. The adhesive layer 1705 may be directly fabricated along with the remainder of the attachment template. Useful choices of material from which to fabricate the adhesive layer 1705 may include one or more materials as described herein. For example, the adhesive may be an ultraviolet (UV) curing adhesive or pressure sensitive adhesive. In some embodiments, the adhesive is omitted.

After contacting the adhesive layer to a tooth, it may be induced to form a bond between the tooth and the attachment 1702, using a method appropriate to the material chosen, which may for example include such steps as photopolymerization, the application of pressure, the application of heat, or the chemical reaction of the adhesive material with an activator. When dealing with adhesive materials for which photopolymerization is to be used, it may be desirable to fabricate the aligner 1701, attachment 1702, and/or other portions of the attachment template 1700 from transparent materials, permitting applied light to more efficiently set the adhesive. Alternatively or additionally, in some cases the adhesive layer 1705 may be applied independently, for example as a separate step of manufacture, or by a dental practitioner.

In some cases, the attachment template may further comprise a cover 1706 over the adhesive layer 1705, to protect the adhesive layer 1705 and the attachment 1702. In some instances, the cover 1706 may seal the adhesive layer and attachment 1702 within the support 1703 prior to attachment to a patient's tooth. During the attachment procedure, the cover may be removed, for example by pulling on a handle-like portion 1707, to reveal the attachment and adhesive, which may then be contacted to a patient's tooth by placing the attachment template over the patient's tooth.

Each of the aligner 1701, attachment 1702, support 1703, coupling structure 1704, adhesive 1705, cover 1706, and handle 1707 may be directly fabricated as part of a single process as described herein. The materials for each of these components can be chosen independently. Typically, the attachment 1702 will comprise a rigid material; the aligner 1701 will comprise a more flexible material; the adhesive material 1705 will comprise a material capable of bonding to a patient's tooth and the attachment; and the cover 1706, handle 1707, and coupling structure 1704 will comprise materials that may be broken or removed by applying a small amount of force with a hand or dental instrument. Other variants, including the use of composite materials and other materials as disclosed herein, will be apparent to one of ordinary skill in the art.

Figure 17B:
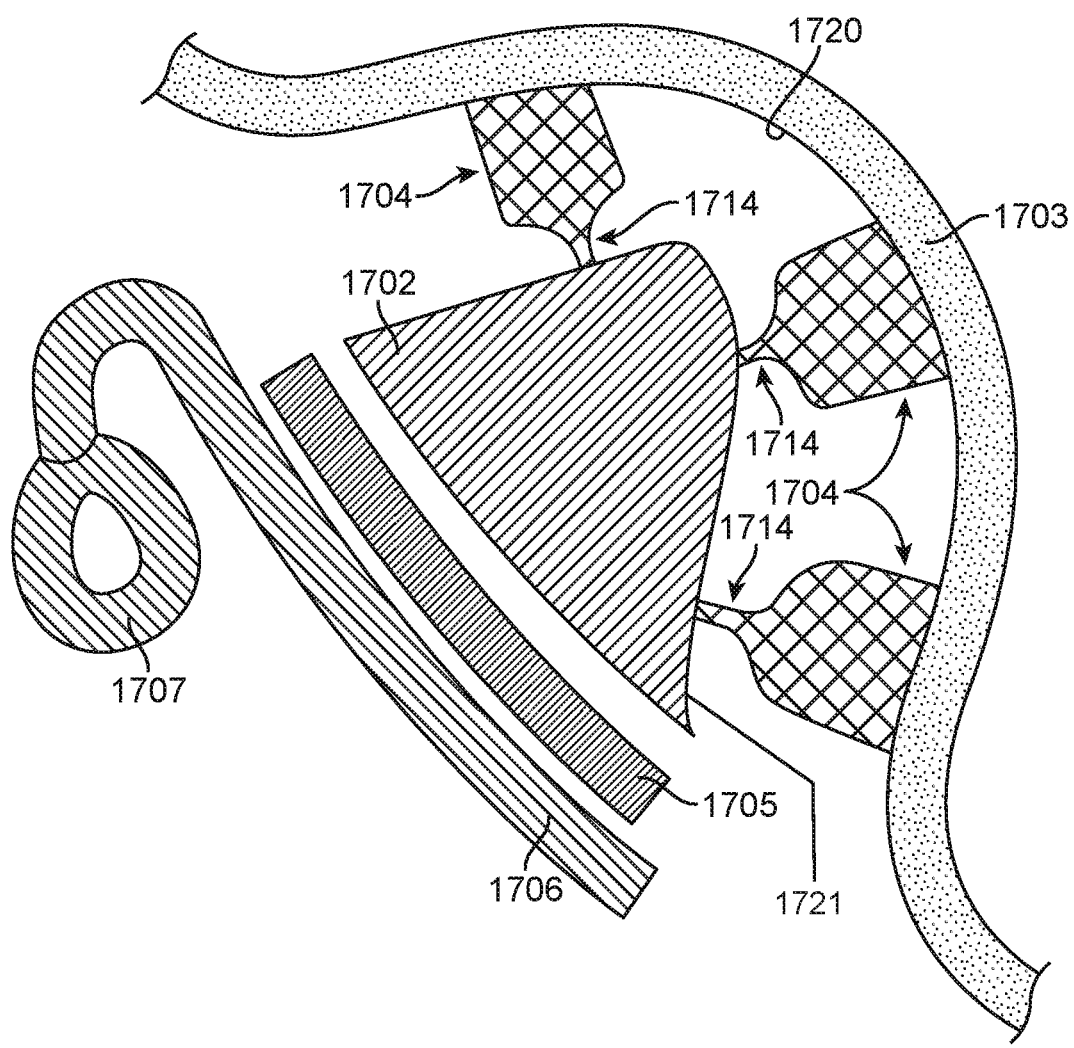
FIG. 17B illustrates a detailed view of a receptacle of an attachment template, such as that illustrated in FIG. 17A.

FIG. 17B illustrates a detailed view of a support 1703 of an attachment template, such as that illustrated in FIG. 17A. The support 1703 is illustrated in exaggerated format with a larger space than may be used for coupling structure 1704 in at least some cases, so that the structure of the connection made by coupling structure 1704 between attachment 1702 and support 1703 may be more clearly seen. As illustrated, coupling structure 1704 comprises one or more extensions 1714, which hold the attachment 1702. After attaching attachment 1702 to a tooth, the extensions 1714 may be broken by applying a small amount of force on the attachment template. The extensions 1714 may comprise structures to facilitate breakage, such as a narrow cross sectional profile having a smaller cross section near the attachment and a large cross sectional profile having a larger cross section away from the attachment. Alternatively or in combination, the extensions may comprise additional structures to facilitate removal such as a lower density material or voids, for example. The material of extensions 1714 may comprise a material suitable to fracture such as a rigid material or brittle material, for example. In some embodiments, the material of the extension 1714 may absorb infrared light or radio frequency radiation at a rate that is greater than one or more of the attachment 1702, the template 1700, and the adhesive 1705. Absorbing infrared light or radio frequency radiation may cause the extension to heat up and soften or melt while the template and extension 1714 remain hard or solid, allowing the coupling structure 1704 to separate from the attachment 1702. After freeing the extension from the coupling structure 1704, it may be desirable to smooth the attachment surface to remove any jagged or abrasive portions that may remain and cause discomfort to the patient or otherwise interfere with future interactions between the attachment and appliance surfaces. FIG. 17B also illustrates a version of cover 1706 comprising a loop structure as a handle, which may be used to more easily mate with a dental instrument.

In some embodiments, the material of the extension 1714 may be dissolvable in a liquid at a rate that is greater than the rate at one or more of the attachment 1702, the template 1700, and the adhesive 1706 dissolves. In some embodiments, the extensions 1714 may be configured to fracture or separate from the attachment when subjected to ultrasonic vibration.

In some embodiments, the template 1700 may define the shape of the attachment 1702. For example, the inner surface 1720 of the template 1700 may be shaped to define an outer surface 1721 of the attachment 1702. In such an embodiment the attachment 1702 may be formed directly on the inner surface 1720 of the template 1700 such that the outer surface 1721 of the template 1700 takes on the shape of the inner surface of the attachment 1702. In some embodiments, the inner surface of the template 1700 may be coated with a release agent or non-stick coating, such as Teflon, to facilitate separation of the attachment 1702 from the template 1700 after attaching the attachment 1702 to a tooth. In some embodiments, the attachment 1702 may be formed from a UV curing material, such that the template 1700 with the attachment 1702 can be placed over a patient's tooth, the attachment 1702 can then be cured in place in the template 1700 and on the patient's tooth, and then the template 1700 may be removed from the patient's tooth, which the attachment 1702 remaining attached to the patient's tooth.

In order to accurately place the attachment on a patient's tooth, the attachment template can be fabricated as part of a larger appliance comprising a plurality of tooth-receiving cavities, such as at least a portion of aligner 100 of FIG. 1, for example. The at least the portion of aligner 100 comprises a tooth-receiving alignment structure such as at least a portion of a tooth-receiving cavity so as to receive a feature of a tooth, for example. The attachment 1702 may be fabricated within a receptacle of the aligner, such as receptacle 106. When the aligner 100 is placed upon a patient's teeth 102, the tooth-receiving cavities of the aligner receive the patient's teeth, holding the aligner in an orientation that may be used to precisely locate an attachment 1702 on a patient's tooth. After bonding the attachment to the patient's tooth, the coupling structure 1704 may be separated from the attachment, and the aligner 100 removed, leaving the attachment 1702 attached to a patient's tooth, as shown in FIG. 1 as attachment 104. The attachment can be separated from the aligner 100 in many ways, for example with one or more of breaking or separation of a weak bond between the attachment and the at least the portion of the appliance. When placing a plurality of attachments, the aligner 100 may comprise a plurality of receptacles 106, each holding an attachment for one of a plurality of teeth 102. In some cases, one or more tooth-receiving cavities may comprise a plurality of receptacles, allowing a plurality of attachments to be adhered to each of one or more teeth.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. An appliance for placing attachments on teeth of a patient, the appliance comprising:
   - a support, the support comprising a plurality of coupling structures composed of a first polymeric material;
   - an attachment comprising a second polymeric material different than the first polymeric material, wherein the plurality of coupling structures are each joined to the attachment at a corresponding interface; and
   - an alignment structure composed of a third polymeric material more flexible than the first polymeric material and at least a portion of a receptacle sized and shaped to receive a tooth, the alignment structure coupled to the support to receive at least a portion of a tooth and to position the attachment at a predetermined location on the tooth;
   - wherein the at least the portion of the receptacle, the alignment structure comprises at least a portion of a receptacle sized and shaped to receive the tooth and wherein the support extends from the at least the portion of the receptacle to define a recess, the recess shaped to receive the attachment and comprising one or more coupling structures extending from the support into the recess to hold the attachment, and wherein the at least the portion of the receptacle, the support, and the coupling structures are directly fabricated together as a single continuous unit;
   - wherein the support extends from the at least the portion of the receptacle to define a recess, the recess shaped to receive the attachment and comprising one or more of the plurality of coupling structures extending from the support into the recess to hold the attachment; and
   - wherein each of the plurality of coupling structures are configured to detach from the attachment at the corresponding interface upon removal of the alignment structure from the tooth.

2. The appliance of claim 1, wherein the plurality of coupling structures each comprise a first extension made of the first polymeric material extending across a gap between the support and the attachment.

3. The appliance of claim 1, wherein the first polymeric material is a material that absorbs infrared light at a rate greater than the third polymeric material, causing the extensions to be selectively heated when the appliance is exposed to infrared light to the point that they soften or melt, thereby facilitating the removal of the alignment structure from the tooth.

4. The appliance of claim 1, further comprising an adhesive on the attachment.

5. The appliance of claim 4, further comprising a cover on the adhesive, the cover capable of removal from the adhesive.

6. The appliance of claim 1, wherein each of the corresponding interfaces comprises a narrowed region relative to the plurality of coupling structures.

\* \* \* \* \*